US010309016B2

(12) United States Patent
Allemand et al.

(10) Patent No.: US 10,309,016 B2
(45) Date of Patent: Jun. 4, 2019

(54) METHOD FOR PREPARING A CARBIDE CERAMICS MULTILAYER COATING ON, AND OPTIONALLY IN, A PART MADE OF A CARBON-CONTAINING MATERIAL USING A REACTIVE MELT INFILTRATION RMI TECHNIQUE

(71) Applicants: COMMISSARIAT A L'ENERGIE ATOMIQUE ET AUX ENERGIES ALTERNATIVES, Paris (FR); CENTRE NATIONAL DE LA RECHERCHE SCIENTIFIQUE, Paris (FR)

(72) Inventors: Alexandre Allemand, Arnozan (FR); Edouard Guillermin, Meylan (FR); Yann Le Petitcorps, Leognan (FR)

(73) Assignees: Commissariat a l'energie atomique et aux energies alternatives, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 14/773,648

(22) PCT Filed: Mar. 7, 2014

(86) PCT No.: PCT/EP2014/054507
§ 371 (c)(1),
(2) Date: Sep. 8, 2015

(87) PCT Pub. No.: WO2014/135700
PCT Pub. Date: Sep. 12, 2014

(65) Prior Publication Data
US 2016/0040299 A1 Feb. 11, 2016

(30) Foreign Application Priority Data
Mar. 8, 2013 (FR) ...................................... 13 52112

(51) Int. Cl.
C04B 35/83 (2006.01)
C04B 41/45 (2006.01)
(Continued)

(52) U.S. Cl.
CPC ............ C23C 24/10 (2013.01); C01B 32/956 (2017.08); C04B 41/009 (2013.01); C04B 41/52 (2013.01); C04B 41/89 (2013.01)

(58) Field of Classification Search
CPC .......... C04B 35/5622; C04B 35/58007; C04B 35/38058; C04B 35/58085
See application file for complete search history.

(56) References Cited

U.S. PATENT DOCUMENTS 5,392,500 A * 2/1995 Olry ...................... C04B 35/83
28/112
7,297,368 B2 11/2007 Williams et al.
(Continued)

FOREIGN PATENT DOCUMENTS

EP 0 492 436 A2 7/1992
WO WO 2009/081006 A2 7/2009

OTHER PUBLICATIONS

Verdon et al., High temperature oxidation of two- and three-dimensional hafnium carbide and silicon carbide coatings, Journal of the European Ceramic Society, vol. 34, Issue 4, pp. 879-87 (Year: 2004).*
(Continued)

Primary Examiner — Francisco W Tschen
(74) Attorney, Agent, or Firm — Oblon, McClelland, Maier & Neustadt, L.L.P.

(57) ABSTRACT

A method preparing a metals carbides multilayer coating on at least one surface of a first carbon layer of a substrate, or under the surface inside the first carbon layer, by a reactive melt infiltration technique, includes: a) putting the surface
(Continued)

into contact with a solid metal disilicide $MSi_2$, M is selected from hafnium, titanium, and tantalum; b) heating the substrate and the metal disilicide to above the melting temperature of the metal disilicide; c) observing a plateau at the temperature for a sufficient duration so that the metal disilicide reacts with the carbon and forms a first multilayer coating including a dense and continuous layer of SiC, fully covered by a dense and continuous layer of MC; d) cooling the part with the first multilayer coating; and then, at the end of d), optionally e) depositing a second carbon layer at the surface of the first multilayer coating.

17 Claims, 16 Drawing Sheets

(51) Int. Cl.
　　　*C04B 41/50*　　　(2006.01)
　　　*C04B 41/52*　　　(2006.01)
　　　*C04B 41/89*　　　(2006.01)
　　　*C23C 24/10*　　　(2006.01)
　　　*C01B 32/956*　　(2017.01)
　　　*C04B 41/00*　　　(2006.01)

(56) References Cited

U.S. PATENT DOCUMENTS

| | | | | |
|---|---|---|---|---|
| 2002/0152614 | A1* | 10/2002 | Kurth | B01J 35/04 29/890 |
| 2003/0136502 | A1* | 7/2003 | Lavasserie | B29C 70/025 156/253 |
| 2003/0143436 | A1* | 7/2003 | Forsythe | C04B 41/009 428/698 |
| 2004/0013875 | A1* | 1/2004 | Fujioka | B22F 7/062 428/367 |
| 2007/0172659 | A1* | 7/2007 | Shao | C04B 35/5615 428/408 |
| 2008/0199681 | A1* | 8/2008 | Murphy | C04B 35/6269 428/312.8 |
| 2011/0017353 | A1* | 1/2011 | Thebault | C04B 41/5059 148/242 |

OTHER PUBLICATIONS

U.S. Appl. No. 13/881,136, filed Jan. 2015, 2014-0004271, Allemand, et al.
U.S. Appl. No. 14/360,407, filed Sep. 2014, 2014-0287249, Allemand, et al.
U.S. Appl. No. 14/443,616, filed Oct. 2015, 2015-0299052, Allemand, et al.
U.S. Appl. No. 14/773,648, filed Sep. 8, 2015, Allemand, et al.
International Search Report and Written Opinion dated Jul. 7, 2014 in PCT/EP2014/054507 (with English language translation).
Preliminary Search Report dated Nov. 22, 2013 in French Patent Application No. 1352112 (with English translation of catecories of cited documents).
Dehashis Bandyopadhyay, "The Ti—Si—C System (Titanium-Silicon-Carbon)" Journal of Phase Equilibria and Diffusion, vol. 25 No. 5, 2004, pp. 415-420.
H. Bittermann, et al. "Critical Assessment and Thermodynamic Calculation of the Binary System Hafnium-Carbon (Hf—C)" Journal of Phase Equilibria, vol. 18, No. 4, 1997, pp. 344-356.
Alixe Dekeyrel, "Mise au point d'un procede d'elaboration rapide de composites Carbone/Carbone haute densite", Memoire de these, L'Universite Bordeaux 1, No. d'ordre: 4017, 2010, 2 Pages (English Abstract only).
E. O. Einset, "Analysis of Reactive Melt infiltration: I. Derivation of the Governing Equation" Chemical Engineering Science, 18771, 1998, 8 Pages.
A. Favre, et al. "An original way to investigate the siliconizing of carbon materials" Ceramics International, vol. 29, 2003, pp. 235-243.
E. Fitzer, et al., "9. Oxidation and Oxidation Protection of Carbon/Carbon Composites" Carbon reinforcements and carbon/Carbon Composites, 1998, pp. 281-309.
A.B. Gokhale, et al., "The Hf—Si (Hafnium-Silicon) system" Bulletin of Alloy Phase Diagrams, vol. 10, No. 4, 1989, pp. 390-393.
William B. Hillig, et al., "Silicon/Silicon Carbide Composites" Ceramic Bulletin, vol. 54, No. 12, 1975, pp. 1054-1056.
Walter Krenkel, et al., "6: Carbon Fibre Reinforced Silicon Carbide Composites (C/SiC, C/C-SiC)" Handbook of Ceramic Composites, 2005, pp. 117-148 and Cover Page.
Emily S. Nelson, et al., "Parametric Study of Reactive Melt Infiltration" Application of Porous Media Methods for Engineered Materials, vol. 233, 18770, 1999, 11 Pages.
Aurelie Quet, "Composites de Friction a Matrice Ceramique" Memoire de these, L'Universite Bordeaux 1, No. d'ordre: 3512, 2 pages (English Abstract only).
E. Rudy, "C—Hf—Si Phase Diagram" Technical Report AFML-TR-65-2, Part V, Ternary Phase Equilibria in Transition Metal-Boron-Carbon-Silicon Systems, No. 150168, May 1969, 4 pages.
R. Voigt, et al., "Development of ultra-high temperature stable ceramics by reactive infiltration processes" Processing and Properties of Advanced Ceramics and Composites III, 2011, pp. 123-130.
Yiguang Wang, et al. "C/C-SiC—ZrC composites fabricated by reactive melt infiltration with $Si_{0.87} Zr_{0.13}$ alloy" Ceramics International, CERI 5041, doi:10.1016/j.ceramint.2012.02.016, 2012, 28 Pages.
Yicong Ye, et al., "Mechanism of Preparation of Carbon Fiber Reinforced HfC-based Composite by Reactive Melt Infiltration at 1900° C." Journal of the European Ceramic Society, Manuscript No. JECS-D-11-01368, 2012, 46 Pages.
Shouming Zhang, et al., "Preparation of $ZrB_2$ based composites by reactive melt infiltration at relative low temperature" Materials Letters, vol. 65, 2011, pp. 2910-2912.
J.-C. Zhao, et al., "Hf—Si Binary Phase Diagram Determination and Thermodynamic Modeling" Journal of Phase Equilibria, vol. 21, No. 1, 2000, pp. 40-45.
Linhua Zou, et al., "Microstructrual development of a $C_f/ZrC$ composite manufactured by reaction melt infiltration"Journal of the European Ceramic Society, vol. 30, 2010, pp. 1527-1535.

* cited by examiner

↑ Direction of the fibers in the plane

● Fibers perpendicular to the plane

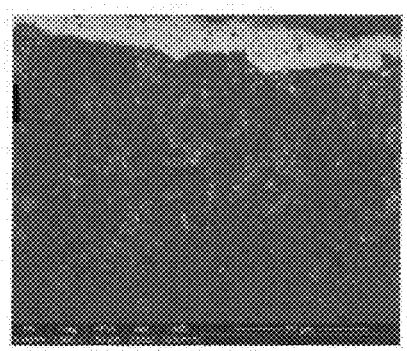
FIG. 18
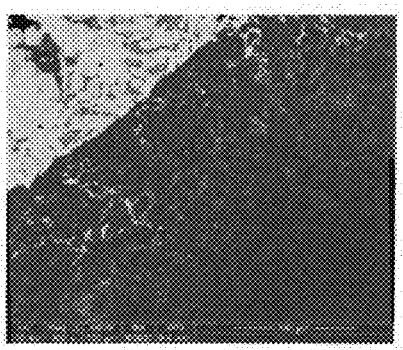
FIG. 19
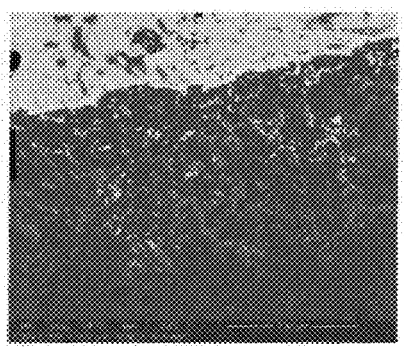
FIG. 20
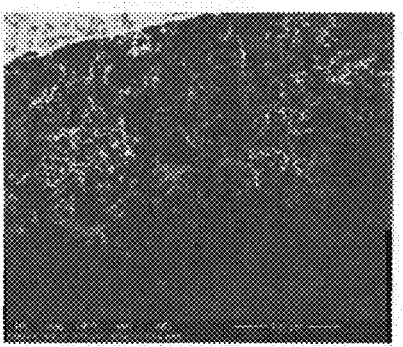
FIG. 21
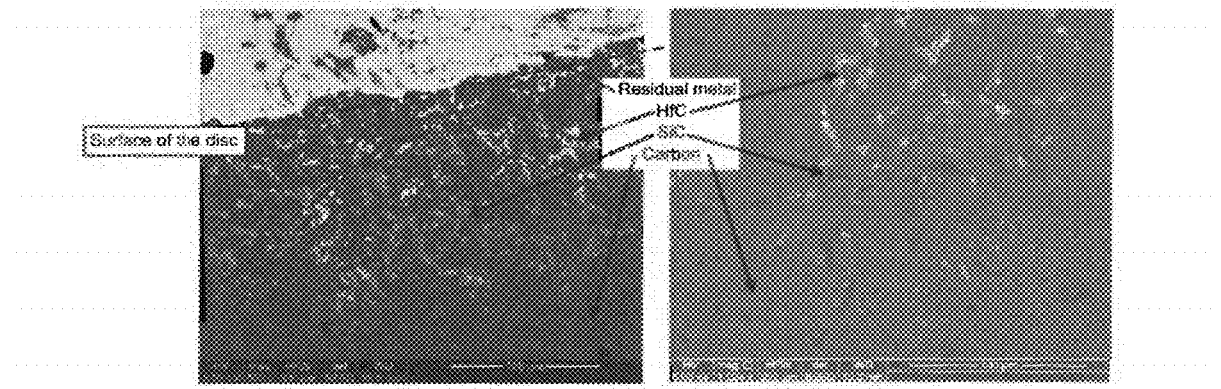
FIG. 22
FIG. 23

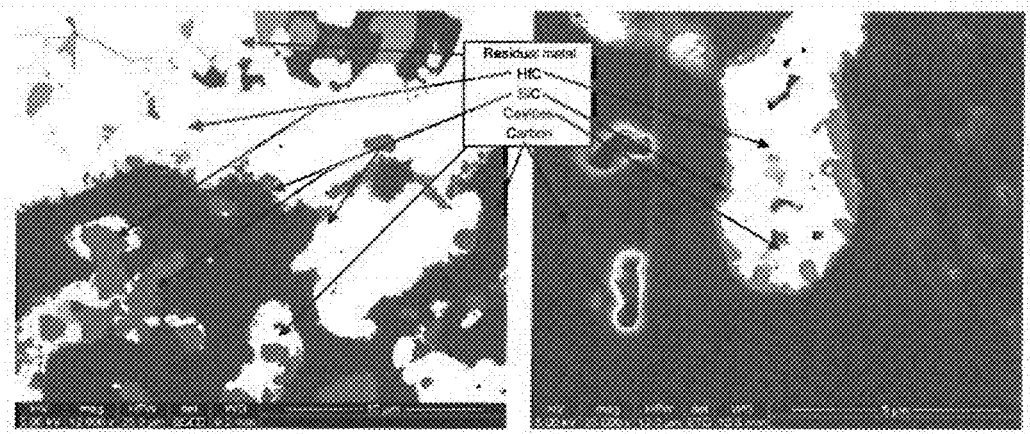
FIG. 24  FIG. 25
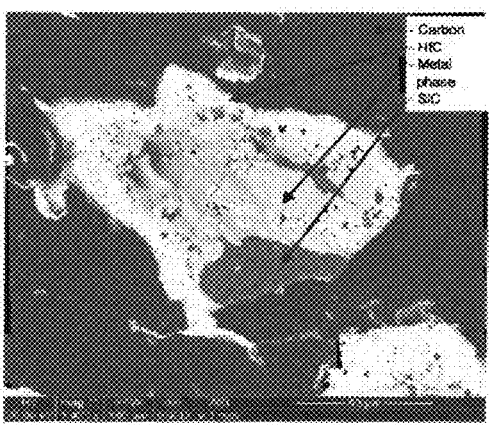 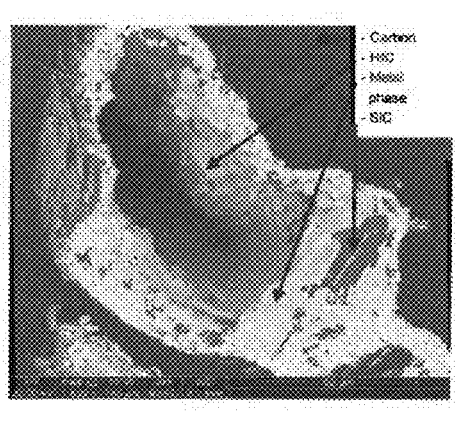
FIG. 26  FIG. 27

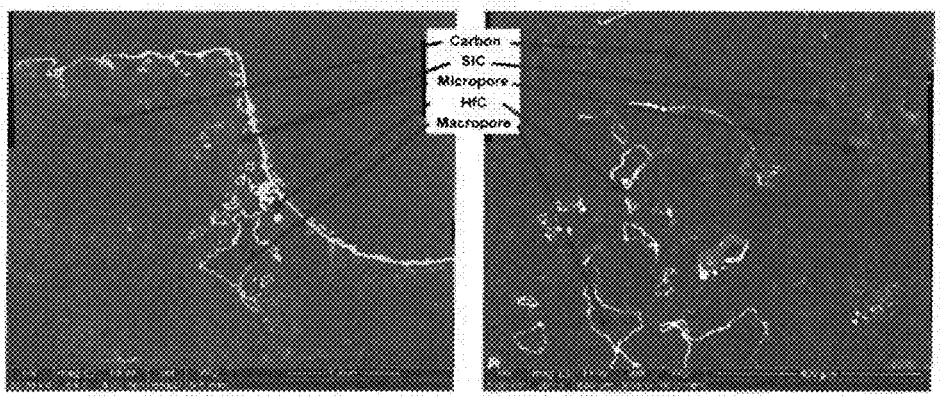
FIG. 28    FIG. 29
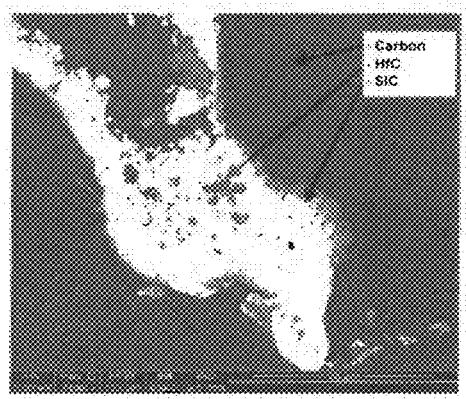 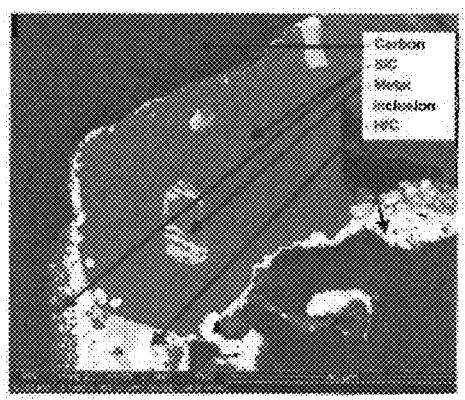
FIG. 30    FIG. 31
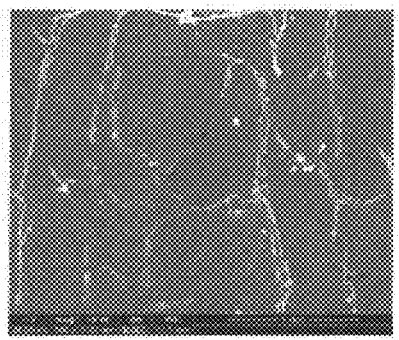 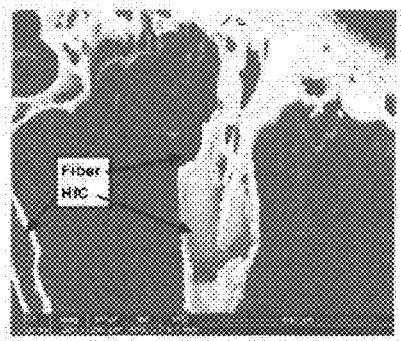
FIG. 32    FIG. 33

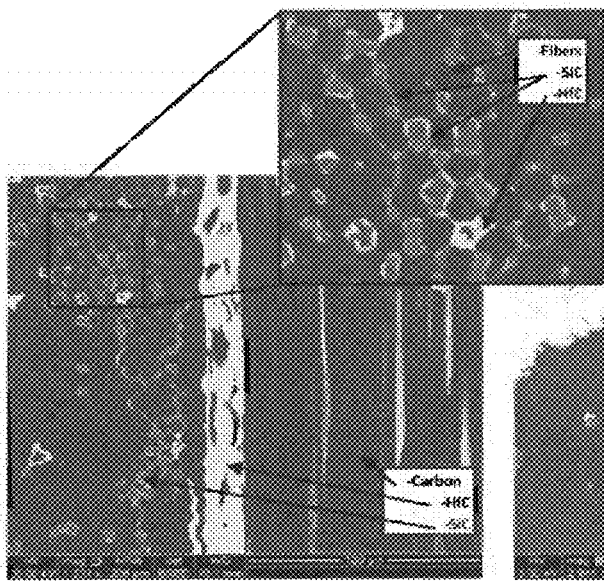
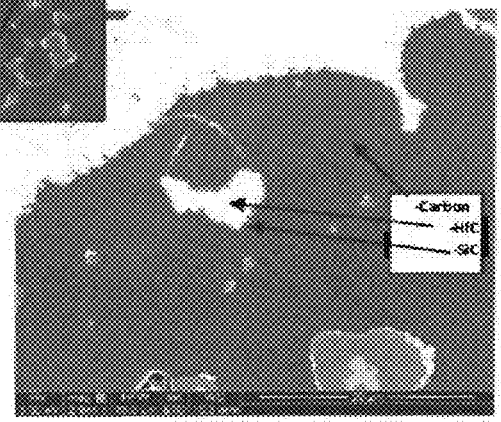
FIG. 40  FIG. 41
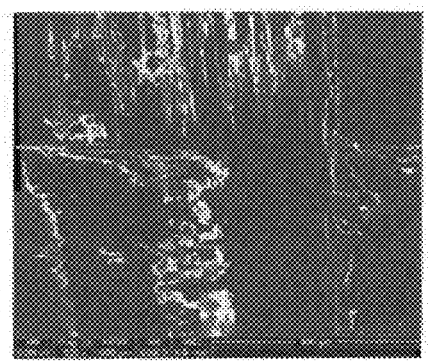
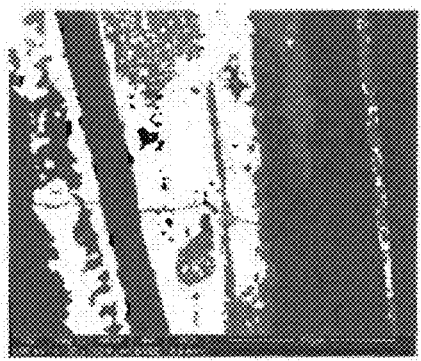
FIG. 42  FIG. 43

METHOD FOR PREPARING A CARBIDE CERAMICS MULTILAYER COATING ON, AND OPTIONALLY IN, A PART MADE OF A CARBON-CONTAINING MATERIAL USING A REACTIVE MELT INFILTRATION RMI TECHNIQUE

TECHNICAL FIELD

The invention relates to a method for preparing a carbide ceramics multilayer coating on, and optionally in, one part made of a carbon-containing material using an RMI (reactive melt infiltration) technique.

The invention also relates to a carbide ceramics multilayer coating and to a part provided with such a coating.

Such a coating may notably be described, but not only, as a protective coating against oxidation («PAO»).

The technical field of the invention may generally be defined as that of protection against oxidation or PAO.

The technical field of the invention is in particular that of protection against oxidation at a high temperature, generally at a temperature above 1,200° C., of carbon-containing materials, i.e. based on carbon, and notably composite carbon/carbon materials.

STATE OF THE PRIOR ART

Composite C/C or carbon/carbon materials have excellent heat conductivity, a low specific gravity and may resist to temperatures above 3,500° C. in atmospheres without any oxygen.

However, in the presence of oxygen, C/C materials degrade very rapidly. From 400° C., the carbon is consumed by the oxygen $O_2$ giving carbon monoxide or dioxide.

This is why materials based on carbon and notably composite carbon/carbon materials have to be provided with an anti-oxidant protection (PAO) which gives the possibility of increasing the performances of these materials under extreme conditions of use.

The protective coatings against oxidation of materials based on carbon, and notably of composite C/C materials may be of different chemical natures.

A distinction is notably made between coatings based on noble metals, coatings based on phosphates; coatings based on boron oxide, borates or borides; coatings based on carbides.

Herein, we shall be more particularly interested in coatings based on carbide.

Protective coatings against oxidation of materials based on carbon, and notably coatings based on carbides may be deposited by chemical vapor deposition techniques (CVD) or chemical vapor infiltration techniques (CVI).

However, the preparation of a protective coating against oxidation with these chemical vapor deposition techniques requires a very long period of time and is of a low yield, since several days are required for producing a deposit, for example with a thickness of 40 μm.

Thus chemical vapor infiltration requires days or even weeks for producing a homogenous and consistent chemical deposit.

Chemical vapor deposition or chemical vapor infiltration techniques, however, are not the only techniques which give the possibility of preparing a protective coating against oxidation and notably a coating based on carbide on carbonaceous materials, the preparation of such coatings by techniques via a liquid route may also be contemplated.

Among these techniques via a liquid route, the reactive melt infiltration (RMI) technique is thus known.

In this technique, a liquid formed with a molten metal or alloy is deposited on a surface of a substrate and infiltrates by means of a pressure gradient either generated by capillarity, or by an applied pressure difference.

The chemical reactivity between the liquid and the substrate, such as a preform, gives the possibility of consuming a portion of the latter in order to obtain the final product.

The infiltration depth, the final porosity, the reaction rate, the formed phases vary according to the various RMI parameters.

Here is a non-exhaustive list of these parameters:

the species constituting the liquid and the substrate, the morphology of the substrate, i.e. the initial porosity, the size and the homogeneity of the pores, the dimensions, etc.

the heat treatment carried out for achieving infiltration, i.e. the temperature rise ramps, the maximum temperature, the duration of the plateaus, etc.

the pressure and atmosphere conditions during RMI, i.e. in air, under a neutral gas atmosphere or further in vacuo.

As compared with other techniques for synthesizing composite materials notably with the purpose of forming a deposit, RMI is very rapid and has a high yield.

Thus, while, as already indicated above, chemical infiltration in a vapor phase requires days or even weeks for carrying out a homogenous and consistent chemical deposition, reactive melt infiltration on the other hand only requires a few minutes or a few hours for producing such a deposit.

In the following an overview of the diverse RMI methods which have been applied with carbon-containing materials and notably with C/C composites is given.

RMI of Silicon on C/C Composites

The first RMIs on C/C composites were carried out by the «German Centre for Aeronautics and Aerospace» (Deutsches Zentrum für Luft- und Raumfahrt) in 1975, in order to form silicon carbide for protecting the carbon fibers against oxidation.

These reactions were conducted in vacuo at 1,420° C. with silicon on a bare pre-form of carbon fibers.

First studies showed the requirement of protecting the fibers of the pre-forms by deposition of pyrocarbon (PyC) which, not only is more stable in contact with silicon, but especially prevents the destruction of the fibers by consuming its carbon [EVAN 1974, HILL 1975, KREN 2005].

As RMI is a simple method, many parametric studies with view to executing numerical models have been carried out for optimizing the yields of the methods for synthesizing composite materials.

Industrially, from now on, silicidation is accomplished via a liquid route at 1,600° C. with a pressure difference of one atmosphere between the lower face and the upper face of the part.

By increasing the temperature it is possible to reduce the viscosity of the fluid and at the same time enhance the formation kinetics of SiC [EINS 1998, NELS 1999, KREN 2005].

[FAVRE et al.] have also studied the microstructures and the mechanism for forming SiC. An important characteristic of their work appears in many studies on RMI: the presence of isolated carbide crystals in the semi-metallic phase. FAVRE explains this by the breaking of the SiC layer and diffusion of isolated SiC particles in the Si matrix. Accordingly, the authors determined that the growth of the SiC particles was governed by a crystallization and fragmentation mechanism [FAVR 2003].

As silicidation has been the subject of many parametric studies, it is possible to determine an optimum open porosity in order to infiltrate the whole pre-form and fill the majority of the pores. It depends on the size of the pores, on the homogeneity of the latter, on the viscosity of the liquid phase as well as on the impregnation rate [EINS 1998, NELS 1999].

As this method is rapid, with a high yield and inexpensive as regards energy, many studies were conducted relating to different types of materials both for substrates and for infiltrating species. Investigations on $C/ZrB_2$ systems may inter alia be noted by reacting fibers coated with boron with a stoichiometric compound $ZrCu_2$ [ZHAN 2011].

Development of Ultra-Refractory Carbides by RMI in C/C Composites.

The interest for developing ceramics at ultra-high temperatures («UHTC» or «Ultra High Temperature Ceramics») by RMI in C/C composites has recently increased.

Investigations seem to have particularly dealt with the development of zirconium carbides within carbonaceous pre-forms. As zirconium is an element from column IV B of the Mendeleev Table, it has a behavior not only similar to titanium and hafnium but also to tantalum.

a) RMI with Zr [ZOU 2010].

Zirconium (Zr) is of interest for its melting temperature of 1,852° C. As this temperature is less than 2,000° C., the design of the furnace/oven for melting it is less difficult and less expensive than for elements such as hafnium, tantalum and especially tungsten.

ZOU et al. [ZOU 2010] have shown in 2010 that reactive infiltration of a liquid phase of zirconium, into 2D pre-forms of carbon fibers coated with a deposit of Pyrocarbon PyC, has the same behavior as silicon and is governed by the same laws. Indeed, Zr infiltrates within the pre-form by capillary forces and reacts with the carbon deposited on the fibers without attacking the fibers.

The $C_f/ZrC$ sample was then characterized with a scanning electron microscope (SEM), with a transmission electron microscope (TEM) and in XRD. XRD analysis shows the presence of carbon, of ZrC but also of residual $\alpha$-Zr. The carbon fibers are actually coated with a layer of ZrC, and the inter-fiber spaces comprise 2 phases: a metal phase of $\alpha$-Zr and ZrC particles. An extensive observation with an SEM of the layers and particles of ZrC showed the presence of micro- or even nano-inclusions in the carbides. The TEM gave the possibility of checking whether these were $\alpha$-Zr inclusions.

The authors consider that the RMI mechanisms for Si—C systems and Zr—C are similar theoretically. In both systems, after formation of a continuous carbide layer, continuation of the formation of carbide depends on the diffusion of carbon towards the molten metal through the carbide layer. The limited solubility of carbon in the metal then generates a biphasic region, where carbides and metal coexist. When the temperature decreases, the carbides precipitate into the metal phase down to the eutectic temperature. At this point, the metal phase solidifies and cooling involves the transformation of $\beta$-Zr into $\alpha$-Zr. The ZrC carbides which have germinated, grow during the cooling and the coalescence of the latter traps $\beta$-Zr phases which by cooling give $\alpha$-Zr inclusions.

Nevertheless, if the infiltration is achieved with non-alloyed zirconium and the infiltrating substance is in a small amount, contraction occurs during the cooling and many dispersed and detached carbides from the carbon fibers are observed. Therefore there is de-cohesion of the carbide layer with carbon. Many unreacted $\alpha$-Zr metal phases are always present in the pre-form, however they do not fill all the porosities [ZOU 2010].

b) RMI with Si—Zr.

In order to find a remedy to the drawbacks of RMI with zirconium, studies were conducted on the use of binary alloys Si—Zr. It is interesting to specify that silicon is a smelting element: it lowers the melting temperature of many elements if it is alloyed with the latter.

Thus, WANG et al. [WANG 2012] studied in 2012 the reactive liquid phase infiltration of a binary alloy 87Si13Zr (atomic %) into a 3D pre-form of needled carbon fibers.

By depositing pyrocarbon on the fibers, it was possible to densify the pre-form up to a density of 1.4 g·cm$^{-3}$ with an open porosity of 25%, the size of the pores being mainly comprised between 20 and 80 µm. The alloy 87Si13Zr is used as a powder. RMI took place at 1,800° C. under a pressure of 3 kPa. The sample was characterized with TEM and XRD.

The use of a silicon alloy containing zirconium for achieving reactive infiltration gives the possibility of generating a coherent carbide layer with the carbon.

It is interesting to note that a microstructure gradient is observed and that the SiC—ZrC carbide concentration varies according to the distance of the fiber.

The observed architecture is therefore the following: the fiber covered with carbon deposited by CVD, and then a SiC—ZrC gradient, wherein the ZrC concentration increases according to the distance relatively to the fiber, and finally an unreacted $ZrSi_2$ metal phase.

The SiC presence exclusively at the interface is explained by the low zirconium concentration of the initial alloy, the silicon having melted before the zirconium.

As SiC forms, the Zr concentration in the alloy increases and a larger $ZrSi_2$ phase then at the beginning of the method is formed.

As the alloy is enriched with Zr, ZrC is increasingly formed, which explains the SiC—ZrC gradient of the matrix.

This gradient was also observed with the alloy of composition 80Si20Zr (atomic %). [WANG 2012].

c) RMI with Hf.

VOIGT et al. [VOIG 2011] performed a study in 2010 for determining the reactivity with carbon of 4 hafnium alloys, with view to producing hafnium carbides by RMI with low melting point alloys rather than by hot isostatic compression, as this is the present case in industry.

The studied systems are those shown in the Table below.

TABLE 1

Alloys studied in the publication of Voigt et al. [VOIG 2011]

| | Alloy | | | |
|---|---|---|---|---|
| | SiHf | HfV | TiHf | HfMo |
| Hf atomic percentage | 8 | 43 | 20 | 34 |
| Melting temperature (° C.) | 1338 | 1456 | 1650 | 1866 |

The alloys powders are in a first phase cold compressed under 150 MPa with a carbon powder, in a stoichiometric ratio of 2 metal atoms for 3 carbon atoms respectively, in order to allow significant formation of carbide.

A phenol resin is used as a binder in a proportion of 30% by volume. The samples are then pyrolyzed at 1,000° C. under an argon atmosphere for 30 minutes.

Finally the samples are annealed in an argon atmosphere in a graphite oven at a temperature of more than one sixth or one quarter above the melting point of the alloy contained in the sample.

The annealing time varies between one hour and five hours. The samples are then characterized by observation in a scanning electron microscope and with diffraction of X-rays.

The Table hereafter summarizes the formation enthalpies of the studied carbides.

TABLE 2

Formation enthalpies of a few carbides [VOIG 2011; KREN 2005]

| | Carbide | | | | | |
|---|---|---|---|---|---|---|
| | HfC | TiC | VC | SiC | ZrC | Mo$_2$C |
| Formation enthalpy at 25° C. (kJ · mol$^{-1}$) | 209.6 | 184.3 | 100.8 | 68 | 49.5 | 46 |

For the alloy SiHf8at %, the XRD results do not show any influence of time and of annealing temperature on the phases present in the final sample. No initial metal phase (Si and HfSi$_2$) is detectable on the sample having been treated at the lowest temperature for one hour. Hafnium carbides seem to germinate at the interface with the carbon, which is consistent with the formation enthalpies of the carbides according to the authors: Hf should react in a first phase in order to form HfC. Next, the diffusion processes of carbon through the hafnium carbide to the interface lead to complete reaction of the HfC and SiC alloy even in the core of the sample.

The Hf—V system seems to be dependent on time and on the annealing temperature but also on the carbon used: initial intermetallic phases (HfV$_2$) are always found after annealing at 1,700° C. for 2.5 hours. The system seems to be more reactive with amorphous carbon and a dependency of the stoichiometry of the vanadium carbides according to annealing time is observable. It is possible that this strong time dependency be due to the formation of a passive carbide layer around particles of intermetallic compounds. HfC is always located at the interface with the carbonaceous matrix, the vanadium carbides themselves are in contact only with HfC.

The Hf—Ti system does not show any dependency as regards time and annealing temperature. The formation enthalpies of the HfC and TiC carbides would indicate simultaneous formation, but it is found that only one TiC layer is formed, it is constantly in contact with the carbon. A possible reason is the wetting difference between the Ti-rich phases and the Hf-rich phases with the carbon. As hafnium does not react, it seems that no diffusion of carbon through TiC occurs for forming HfC.

Finally, the Hf—Mo system does not react as expected: the formation enthalpy difference of both carbides would indicate a complete reaction of hafnium for forming HfC, but regardless of the annealing time, a residual Hf metal phase is detected by XRD.

d) RMI with Hf—Si—Zr

YE et al. [YE 2012] were interested in the mechanisms for forming microstructures of C$_f$/(Hf,Zr,Si)C composites during reactive infiltration in a liquid phase at 1,900° C. (see FIGS. 1A, B, C, D).

The pre-form C—C (11) used consists of carbon fibers T300 on which was deposited a pyrocarbon layer in order to avoid damaging the pre-form during RMI. The pre-form has an initial density ρ of 1.29 g·cm$^{-3}$.

The alloy used is a ternary alloy of composition 50Hf-40Si-10Zr (atomic %) for which the melting temperature is 2,440° C., an ingot thereof was formed in an arc furnace. The RMI reaction is carried out in a graphite crucible for 30 minutes at 1,900° C. The sample is then observed and analyzed with a scanning electron microscope, in energy dispersive x-ray spectroscopy (EDXS) and in XRD.

At 1,900° C., the alloy in contact with the pre-form melts (liquid alloy 12) by the exothermicity of the carbidation reactions of Hf occurring at the surface, the infiltration then takes place, and formation of carbide inside the pre-form is initiated. The microstructure around the fibers described by the authors, are formed in three phases. In a first phase, substantial germination of HfC carbide (13) takes place in contact with PyC. This forms a non-continuous HfC layer around the fibers, since the amount of pyrocarbon is much larger than that of Hf. Certain HfC carbides grow (HfC particles 14) while an Si-rich liquid (15) is produced. Finally, a continuous SiC phase forms, and then becomes the matrix (16) of the HfC particles (first layer 17 and second layer 18). Finally a last layer (19) is formed consisting of mixed carbides and of metal phases [YE 2012] (see FIGS. 1 A, B, C, D).

As the carbidation of hafnium is very rapid, the HfC carbide layer at the surface rapidly blocks the infiltration channels and thus limits the infiltration depth of the alloy.

e) Industrialization of RMI for Synthesis of Carbides Other than SiC in C/C Materials.

The document of WILLIAMS et al. [WILL 2007] describes a method for synthesis of carbides of refractory metals within composite C/C materials with RMI.

The infiltration metals are selected from metals for which the melting point is above 1,850° C. such as for example vanadium, chromium, zirconium, niobium, molybdenum, hafnium, tantalum, tungsten, iridium. The preferred infiltration metals are metals from group IV such as zirconium and hafnium.

The method consists of using a pre-form of carbon fibers, wherein no additional deposition of carbon has been carried out. Deposition of a Zirconia layer of 0.1 μm is produced by CVI, in order to cover each fiber and thus protect them. Once the fibers are coated with the Zirconia layer, a sacrificial carbon layer: pyrocarbon, is deposited by CVI in order to be used as a reagent in the next step. RMI is then carried out at 1,950° C. for 10 minutes with zirconium under an argon and hydrogen atmosphere. The exhibited zirconium volume corresponds to 115% of the porosity volume of the pre-form. The sacrificial carbon has entirely reacted and the porosity is then only 5%. The spaces having been filled consist of zirconium carbides, rich in zirconium. Finally, a second RMI is carried out with silicon for 10 minutes at 1,500° C., always under an argon and hydrogen atmosphere.

It is specified that the first RMI may leave residual metal phases of the Zr type, but they are not critical for use of the material at temperatures above 2,000° C. since Zr may act as a phase making the carbon impervious [WILL 2007].

However, two important points should be retained:

On the one hand, the different studies dealing with the infiltration of refractory carbides via a liquid route in C/C materials all indicate the presence of residual metal phases in the pores or gaps between wires.

Only the RMI of silicon has been sufficiently studied for understanding the critical parameters leading to the absence of reaction of certain metal phases and for limiting the amount of these phases.

On the other hand, the publications dealing with the use of binary and ternary alloys for the synthesis of ultra-refractory carbides via a liquid route all mention the formation of microstructures with a carbide gradient, i.e. for example in the case of a binary alloy of two metals $M_1$ and $M_2$, the $M_1C/M_2C$ ratio varies according to distance relatively to the fibers. These gradient microstructures are explained by thermodynamics and supersaturation of certain elements in metal phases.

Of course it is understood that the gradients which are observed are not formed by well-defined separate layers, each of these separate layers consisting of a single carbide type.

The essential drawback of gradient microstructures is that they consist of mixtures of several types of carbides, which causes poor resistance to oxidation.

Therefore, considering the foregoing, a need exists for a method for preparing a multilayer metals carbides coating on, and optionally in, a carbon-containing material which gives the possibility of preparing by RMI in a single step, such a multilayer coating, each layer of which, consisting of a single and same carbide is continuous, dense and not cracked.

Further, this coating should not have gradient microstructures and should not include residual metal phases, notably residual metal phases with melting temperatures below 2,000° C.

There is still a need for such a method which allows preparation of such a multilayer coating on all sorts of carbon-containing materials without any limitation on the nature thereof whether for example these are carbon fibers, carbon wires, a C/C composite or of any other material covered with carbon.

SUMMARY OF THE INVENTION

This goal, and further other ones, are achieved, according to the invention by a method for preparing a metals carbides multilayer coating on at least one surface of a first carbon layer of a substrate, and optionally under said surface inside said first carbon layer, by a reactive melt infiltration technique, wherein the following successive steps a) to d) are carried out:

a) the surface is put into contact with a solid metal disilicide $MSi_2$ in which M is selected among hafnium, titanium, and tantalum;

b) the substrate and the metal disilicide are heated up to a temperature $T_P$ greater than (above) the melting temperature of the metal disilicide;

c) a plateau at the temperature $T_P$ is observed for a sufficient duration so that the metal disilicide reacts with the carbon and forms a first multilayer coating comprising a dense and continuous layer consisting of SiC, fully (entirely) covered by a dense and continuous layer consisting of MC;

d) the part provided with the first multilayer coating is cooled; and then at the end of step d), optionally the following step e) is further carried out:

e) a second carbon layer is deposited at the surface of the first multilayer coating;

at the end of step d) or of step e), the following successive steps f) to i) are further carried out:

f) the surface of the first multilayer coating still containing carbon, or the surface of the second carbon layer are put into contact with a solid metal disilicide $MSi_2$ wherein M is selected among hafnium, titanium, and tantalum;

g) the surface of the first multilayer coating is heated still containing carbon and the metal disilicide, or the second carbon layer and the metal disilicide are heated up to a temperature $T_P$ above the melting temperature of the metal disilicide;

h) a plateau at temperature $T_P$ is observed for sufficient duration so that the metal disilicide reacts with the carbon and forms a second multilayer coating comprising a dense and continuous layer consisting of SiC, fully (entirely) covered by a dense and continuous layer consisting of MC;

i) the part provided with the second multilayer coating is cooled; and then, at the end of step i), optionally the following step j) is further carried out:

j) a third carbon layer is deposited at the surface of the second multilayer coating;

and at the end of step i) or of step j), optionally the following step k) is further carried out:

k) silicidation of the surface of the second multilayer coating still containing carbon or of the third carbon layer is carried out with liquid Si, whereby a SiC layer is obtained on the second multilayer coating.

Step j) is not carried out alone, if it is carried out, it is followed by step k).

In other words, the method according to the invention may comprise the steps f) to i), or the steps f) to i) and then the steps j) and k), or the steps f) to i) and then step k).

It may be considered that the multilayer coating prepared by the method according to the invention therefore comprises a first multilayer coating and at least one second multilayer coating, and optionally an upper layer of SiC.

Generally, the first carbon layer has an open porosity, for example an average open porosity from 1 to 99% by volume in order to provide a path for access to the metal disilicide.

Generally, the optional second carbon layer and third carbon layer also have an open porosity, for example an average open porosity from 1 to 99% by volume.

It may be stated that the method according to the invention proposes a different route for obtaining alternating carbide deposits.

This method consists of using specific binary alloys with a low melting point capable to infiltrate in the liquid state into the carbon and to react with the latter for forming refractory carbides. The method according to the invention applies a reactive melt infiltration technique or RMI.

The method according to the invention comprises specific sequences of specific steps a) to d) and f) to i), which have never been described in the prior art, as notably discussed in the documents studied above.

The final optional step k) has also not been described in the prior art.

The method according to the invention is notably distinguished from the methods of the prior art in that it applies as a reactive impregnation alloy, a specific alloy which is a metal disilicide $MSi_2$, selected among three particular metal disilicides, i.e. hafnium disilicide $HfSi_2$, titanium disilicide $TiSi_2$, and tantalum disilicide $TaSi_2$.

From among these three metal disilicides, hafnium disilicide $HfSi_2$ is preferred.

Indeed, it was experimentally determined, as this is discussed later on that hafnium disilicide $HfSi_2$ was, from among many other compounds, the intermetallic compound the most suitable for carrying out reactive melt infiltration, «RMI», notably from mixtures of compacted metal powders, in particular at a temperature of less than 1,800° C.

The use of hafnium disilicide not only gives the possibility of obtaining an equi-distribution, of hafnium, over the whole width of the infiltration, but also of having a compound with a single melting point (since it is a defined compound), which avoids premature infiltration of silicon into the part.

Further, as this is also discussed later on, the molten $HfSi_2$ is very fluid and it impregnates even the very low porosities. Consequently, the method according to the invention may be successively applied both with porous carbon-containing material and with dense, or even very dense, carbon-containing materials.

The advantageous properties of $HfSi_2$ within the scope of the method according to the invention, which are discussed later on, i.e. notably, the making in a single step of a first dense and non-cracked SiC/HfC multilayer deposit and then of a second dense and non-cracked SiC/HfC multilayer deposit, are also exhibited by titanium disilicide $TiSi_2$, and tantalum disilicide $TaSi_2$.

Indeed, the formation enthalpies of TaC (−178 kJ/mol at 25° C.) of TiC (−184 kJ/mol at 25° C.) and of HfC (−210 kJ/mol at 25° C.) are evidence that the systems Ta—Si and Ti—Si behave in the same way as Hf—Si.

Therefore, it is also possible to obtain multi-sequenced deposits C/SiC/TaC or C/SiC/TiC.

The method according to the invention does not have the defects, drawbacks, limitations and disadvantages of the methods of the prior art and solves the problems of the methods of the prior art, essentially because in the method according to the invention a particular, specific metal disilicide $MSi_2$, preferably hafnium disilicide, is used.

Thus, as compared with gas phase deposition methods such as chemical vapor deposition (CVD) or chemical vapor infiltration (CVI), the method according to the invention has all the advantages inherent to the RMI method: it is notably rapid and has a high yield.

The method according to the invention surprisingly allows preparation of a non-cracked coating consisting of at least two carbides, i.e. SiC and MC, preferably HfC by liquid phase deposition by the RMI technique.

The first coating is made in a single RMI step by melting, infiltration and reaction with the C of a metal disilicide such as hafnium disilicide. The same applies to the second coating.

Indeed, according to the invention, from a single intermetallic compound and in a single continuous operation without any interruption, a first coating is prepared, including two layers of carbides and then a second coating including two carbide layers is also prepared from a single intermetallic compound and also in a single continuous operation without any interruption.

The first obtained coating, regardless of the nature of the carbon surface consists of a dense, continuous and non-cracked SiC layer which is fully (entirely) covered by a dense, continuous and non-cracked MC layer, such as HfC and this without any cracking. The same applies to the second coating.

By dense layer, is generally meant, in the sense of the invention, that said layer consists of a material for which the density is greater than 95% of the theoretical density, or even equal to 100% of the theoretical density.

Importantly, it should be noted that the coating prepared by the method according to the invention is totally without (free from) any residual metal phase, notably with a melting temperature below 2,000° C.

This is one of the essential drawbacks of the methods of the prior art, and notably of the «RMI» methods of the prior art, as discussed in the foregoing study, which is thus overcome by the method according to the invention.

It should be noted that the SiC and MC such as HfC, layers are quite distinct, quite delimited. Each of these layers consists of a single carbide. The SiC layer thus consists of SiC and only SiC, and does not contain any HfC, while the MC, such as HfC, layer consists of MC and only MC and does not contain any SiC.

There is no carbide concentration gradient in the coating prepared by the method according to the invention and this, both in the first multilayer coating and in the second multilayer coating.

There again, this is one of the major drawbacks of the RMI methods of the prior art, and notably of the RMI methods applying binary alloys, i.e. the presence in the coatings prepared by these methods of the prior art, of microstructures with a carbide gradient, which is overcome by the method according to the invention.

Finally, the method of the invention gives the possibility of making an original multi-sequenced deposit made of ceramics which, not only is located at the surface of the carbon-containing material but also, and this is one of the fundamental characteristics of the coating obtained by the method according to the invention in depth, in the core of the material to be protected. This, in fine, leads to a C/C material or C material with an increasing gradient of ceramics from the core to the surface.

The first carbon layer may be a carbon layer deposited on a substrate which is made of a material different from carbon.

By material different from carbon, are meant all the materials which are different from carbon, regardless of their chemical nature.

In other words, the method according to the invention may be applied to all substrates regardless of the chemical nature of the material, different from carbon which constitutes them, from the moment when at least one surface of this substrate is coated, covered beforehand with a carbon layer, a so called first carbon layer.

This first carbon layer may be deposited by any suitable method, for example by a CVI method, notably in the case of a pyrocarbon layer, or by impregnation with pitch and then pyrolysis of this pitch.

The material different from carbon may notably be selected from carbide ceramics such as SiC; composite materials of carbide ceramics such as SiC/SiC composites; nitride ceramics; boride ceramics; oxide ceramics; metals; and mixtures thereof.

For example, it is possible to deposit a pyrocarbon layer by CVI in the porosities of SiC/SiC composites, and then prepare a multilayer coating on this pyrocarbon layer by the method according to the invention.

Or else the first carbon layer is a layer of a substrate fully (entirely) made of carbon.

Advantageously, the carbon which constitutes such a substrate fully (entirely) made of carbon is graphite.

The carbon which constitutes the substrate fully (entirely) made of carbon may be in the form of carbon fibers, carbon wires or else in the form of a composite carbon/carbon material.

This composite material may be a 2D or 3D composite material.

The substrate may have any shape and any size, however provided that it may be positioned in a chamber allowing application of the reactive melt infiltration technique.

The substrate may notably appear as a planar substrate having a first main surface and a second main surface substantially parallel to each other. Such a substrate may be designated as a pellet or a disc.

This substrate is generally a vertical substrate, the first main surface being an upper surface and the second main surface being a lower surface.

The surface of the substrate on which is prepared the multilayer coating by the method according to the invention is preferably the upper surface.

Advantageously, the carbon substrate has an average open porosity from 1% to 99% by volume. This porosity is determined by measuring the buoyancy force (Archimede's buoyancy).

The contacting of the surface with the solid metal disilicide $MSi_2$ may be achieved in several ways.

Thus, the contacting of the surface with the solid metal disilicide $MSi_2$ may be achieved by depositing the metal disilicide $MSi_2$ on the surface, or else by depositing a carbon substrate and $MSi_2$ in a crucible.

For example, the metal disilicide $MSi_2$ may be deposited on the surface in the form of a powder, either compacted or not, or in the form of a slurry consisting of a metal disilicide $MSi_2$ powder and of a liquid.

This liquid may notably be an organic liquid such as an alcohol like ethanol.

The concentration of the silicide powder in the slurry is generally from 5% to 60% by mass.

Advantageously, during step b), a rapid rise in temperature is carried out. By rapid rise in temperature is generally meant a rise carried out at a rate of 1,000° C./minute to 3,000° C./minute, for example at a rate of 2,800° C./minute, up to the temperature $T_P$.

Advantageously, the temperature $T_P$ is from 900° C. to 2,500° C., for example 1,800° C.

Advantageously, the plateau at temperature $T_P$ is observed for a duration from 5 minutes to 15 minutes.

Thus it was notably noticed that the deposits made of C/C composites did not have any residual metal phase for reactive infiltration parameters of 15 minutes at 1,800° C.

Advantageously, the steps b) to d) of the method according to the invention, are achieved in a dynamic, neutral gas atmosphere, for example an argon atmosphere.

When the substrate is a substrate fully (entirely) made of carbon which has an average open porosity as defined above, i.e. from 1 to 99% by volume, it is advantageously possible to put the surface in contact with a volume of solid metal disilicide $MSi_2$ of less than 30% of the volume of the average open porosity of the carbon substrate, preferably comprised between 20% and 30% of the volume of the average open porosity of the carbon substrate.

It was seen that during the optional step e), a second carbon layer is deposited at the surface of the first multilayer coating.

This second carbon layer may be deposited by any suitable method, for example by a CVI method, notably in the case of a pyrocarbon layer, or by impregnation with pitch and then pyrolysis of this pitch.

This second carbon layer generally has a thickness from 0.1 to 500 μm.

This step e) optionally allows deposition of an additional layer of reagent (of carbon), if there is no more or insufficient carbon at the surface of the first multilayer coating, with view to other subsequent deposits such as those described in steps f) to i).

The steps f) to i) are generally carried out mutandis mutandis in the same way and under the same conditions as steps a) to d).

During the optional step j), a third carbon layer is deposited at the surface of the second multilayer coating. This third carbon layer may be deposited by a method such as the one used for depositing the second carbon layer, it generally has the same thickness as the second carbon layer and it plays a role similar to that of the second layer with view to depositing an SiC layer during step k).

During the optional step k), the second reactive infiltration with silicon not only allows deposition of a new SiC carbide layer, but also homogenization of the MC carbide deposit such as HfC on the substrate.

The steps f) to i) allow further improvement in the properties of the materials obtained at the end of step d), and these properties are still further improved by step k).

In other words, at the end of step d) or e), a second infiltration of metal disilicide such as $HfSi_2$ is achieved by RMI by the steps f) to i) like in the steps a) to d), then it is optionally possible to achieve simple silication with liquid Si (step k) optionally preceded with step j)) in order to obtain simply an SiC layer.

The optional step e), and then the steps f) to i) may then be repeated, for example from 1 to 100 times, and then the optional step j) and the optional step k) are carried out.

The optional step k) (with the optional step j)) is not repeated, when said step is present, it constitutes the final step of the method for forming a final SiC layer «on the top» of the multilayer coating comprising the first multilayer coating and at least one second multilayer coating.

It is thus possible to obtain a large number of SiC and/or SiC/HfC layers.

The present invention thus allows elaboration, through successive RMIs and alternating C deposits, of carbon-containing materials for example composite C/C materials with a carbon gradient as compared with SiC/MC ceramics. This may be of interest for providing functions in the core or else at the periphery of the carbon-containing materials such as C/C composite materials.

Different experiments, which are discussed later on, were conducted and demonstrate that the method according to the invention was actually applied by using a high temperature wetting bench equipped with a high power induction oven.

Thus it was shown that the reactive infiltrations carried out in accordance with the method according to the invention lead to the formation of a multilayer microstructure: in contact with the carbon is located a layer with a thickness of about 50 nm to 1 μm of SiC and of only SiC, and then a layer of HfC alone for which the grain size is generally comprised between 0.5 and 5 μm.

It should be noted that these layers are quite distinct; these are not layers with concentration gradients. Above these hafnium carbides, are found either pores or new SiC carbides, with a grain size comprised between 1 and 15 μm.

It should also be noted that, when the substrate consists of carbon fibers, the latter are intact and retain their integrity, the carbon consumed for carbidization of hafnium and of silicon being the one deposited on the fibers during the burnout (calefaction to which they were subject beforehand.

Similar coatings and having related properties may be prepared, as this was seen above, by using $TaSi_2$ or $TiSi_2$ instead of $HfSi_2$. These silicides lead to the formation of TaC or TiC layers.

Figure 1:
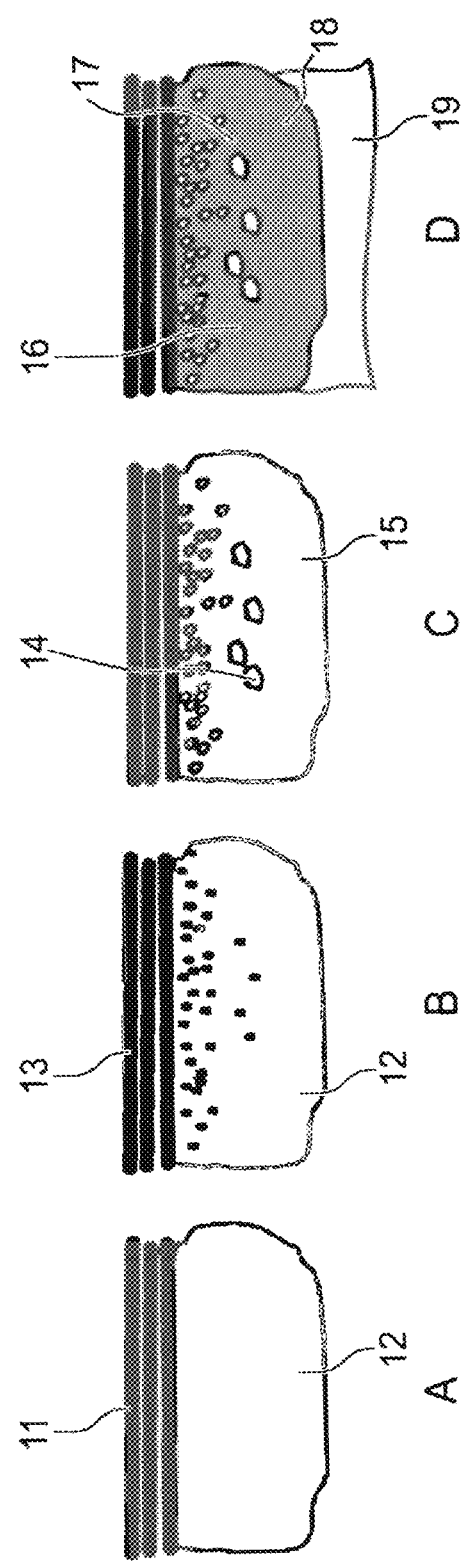
FIG. 1 (A, B, C, D) which does not illustrate the invention, is a diagram which shows the steps for forming the microstructure around the C/C pre-form. (A) The liquid infiltrates the pores of the pre-form. (B) HfC germinates against the PyC interface. (C) The HfC carbides grow. (D) A continuous SiC phase is formed as a matrix of the HfC carbides, and then a third layer forms consisting of carbides and of residual metal phases. [YE 2012].
Figure 2:
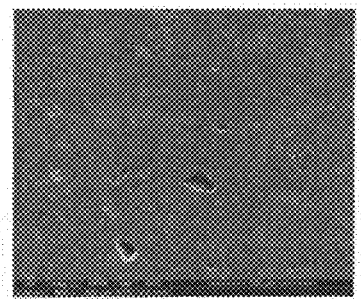
FIG. 2 is a photograph taken with a scanning electron microscope with a secondary electron detector (SE-SEM) which shows the morphology of a graphite disc 2,175.

The scale marked on FIG. 2 represents 100 µm.

Figure 3:
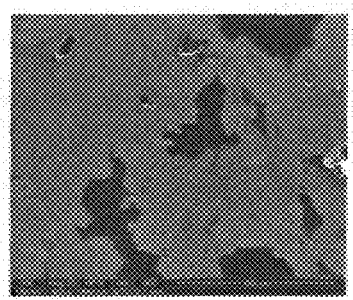

FIG. 3 is a photograph taken with the scanning electron microscope with a secondary electron detector (SE-SEM) which shows the morphology of a graphite disc 6,103.

The scale shown in FIG. 3 represents 300 µm.

Figure 4:
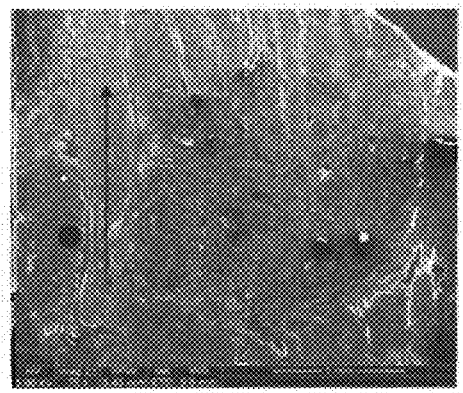

FIG. 4 is a photograph taken with the scanning electron microscope with secondary electron detector (SE-SEM) which shows the morphology of a 2D C/C composite pre-densified by burnout.

The arrow indicates the direction of the fibers in the plane and the circle indicates the fibers perpendicular to the plane.

The scale as shown in FIG. 4 represents 1 mm.

Figure 5:
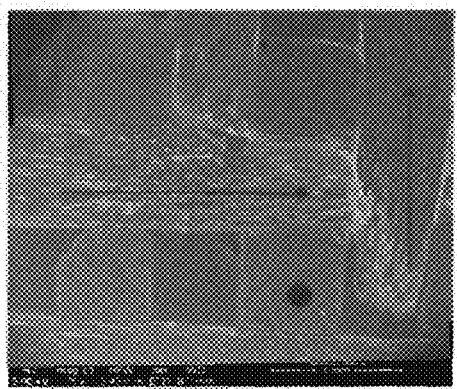

FIG. 5 is a photograph taken with the scanning electron microscope with secondary electron detector (SE-SEM) which shows the morphology of a 3D C/C composite pre-densified by burnout.

The arrow indicates the direction of fibers in the plane and the circle indicates the fibers perpendicular to the plane.

The scale shown in FIG. 5 represents 1 mm.

Figure 6:
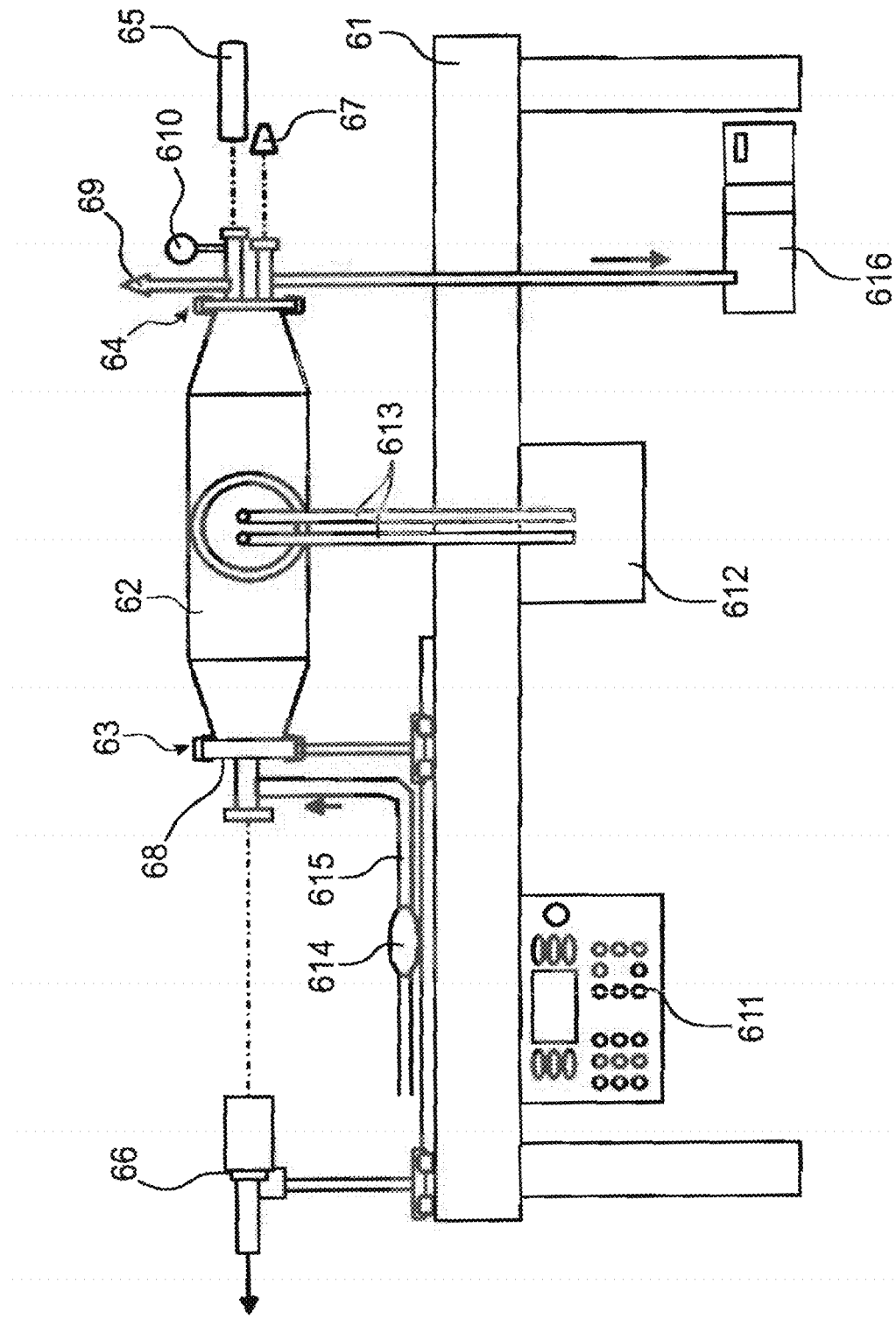

FIG. 6 is a schematic view which illustrates the high temperature wetting bench used in the examples.

Figure 7:
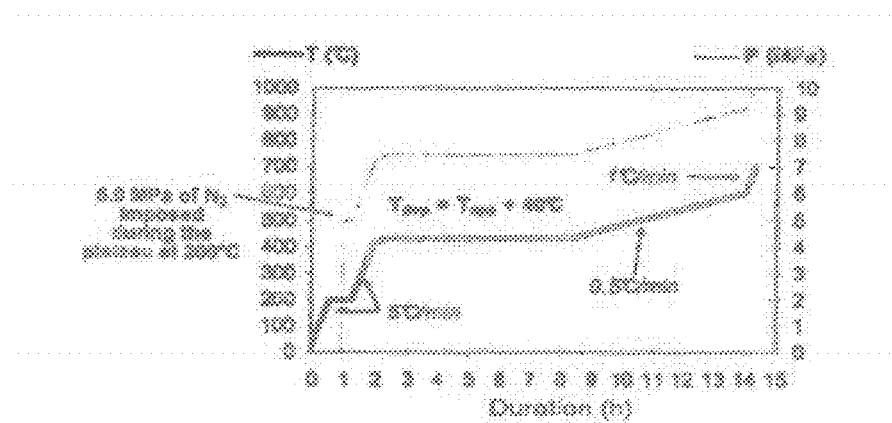

FIG. 7 is a graph which shows the temperature program (in a bold line) and the pressure program (in a thin line) applied during the impregnation and pyrolysis of a pre-form with pitch (pitch 110 M from RUTGERS).

In ordinates on the left side is plotted the temperature (in ° C.). In ordinates on the right side is plotted the pressure (in MPa). In abscissas, is plotted the duration of the treatment (in hours).

Figure 8A:
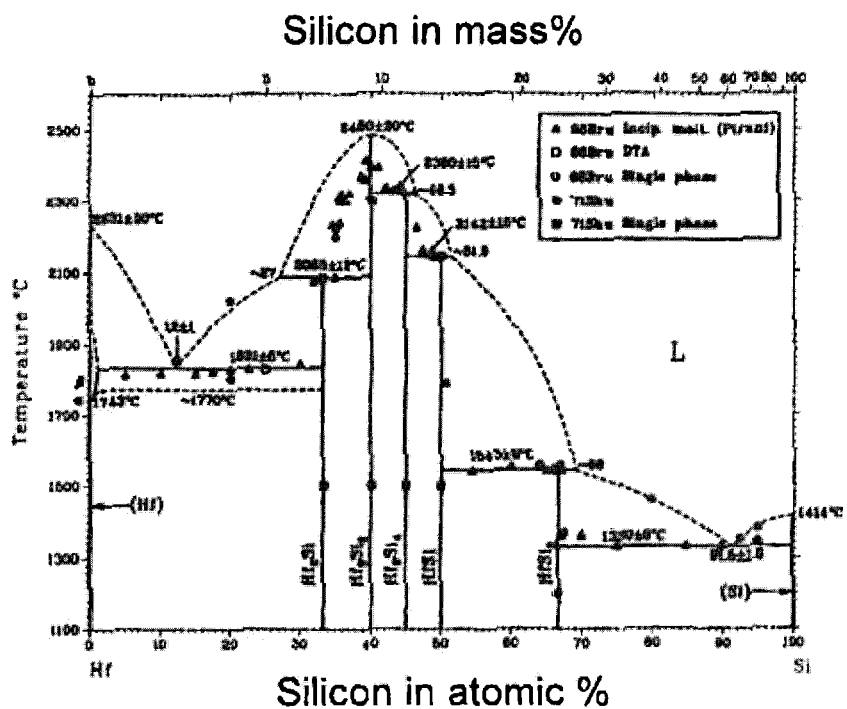
Figure 8B:
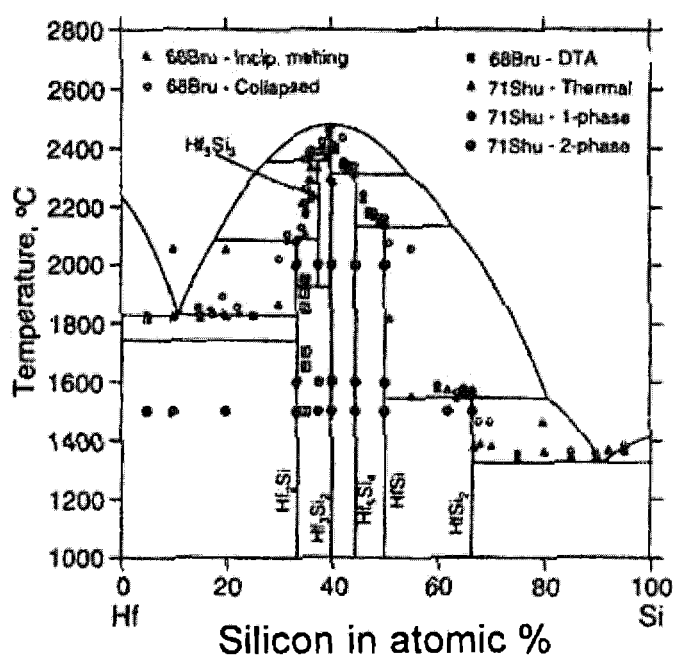

FIGS. 8A, 8B illustrate phase diagrams Hf—Si (on the upper side FIG. 8 (A) according to GOKH 1989, on the lower side FIG. 8 (B) according to ZHAO 2000).

Figure 9:
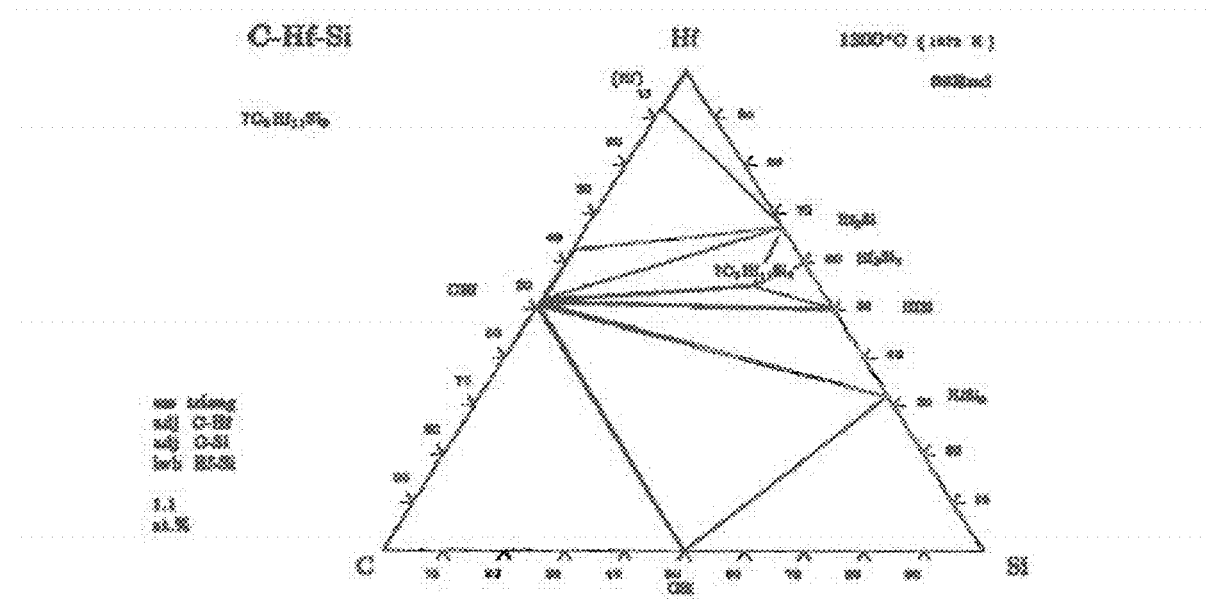

FIG. 9 illustrates the ternary diagram of the C—Hf—Si system at 1,300° C. (according to RUDY 1969).

Figure 10:
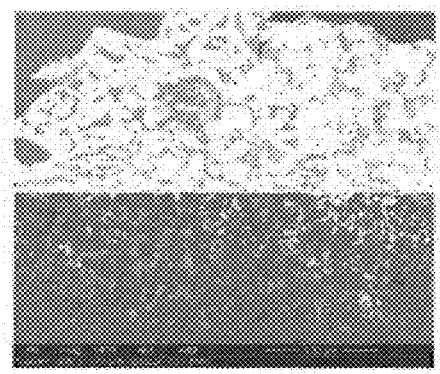

FIG. 10 is a photograph taken with a scanning electron microscope with electron back scattering (BSE-SEM) which shows the infiltration profile of the sample M1.

The scale shown in FIG. 10 represents 100 µm.

Figure 11:
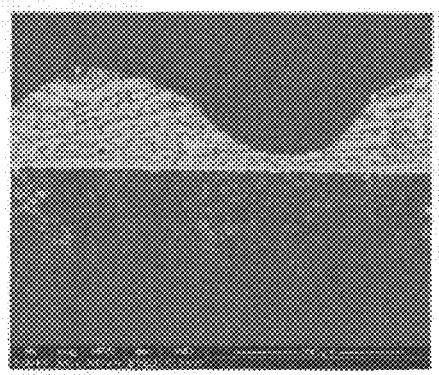

FIG. 11 is a photograph taken with a scanning electron microscope with electron back scattering (BSE-SEM) which shows the infiltration profile of the sample M2.

The scale shown in FIG. 11 represents 200 µm.

Figure 12:
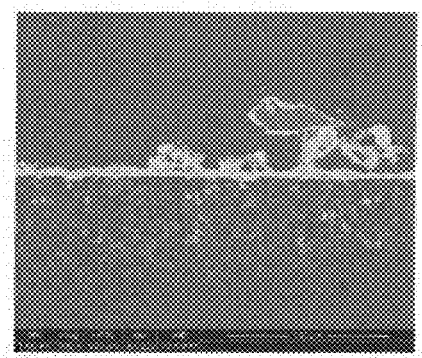

FIG. 12 is a photograph taken with the electron microscope with electron back scattering (BSE-SEM) which shows the infiltration profile of the sample M3.

The scale shown in FIG. 12 represents 200 µm.

Figure 13:
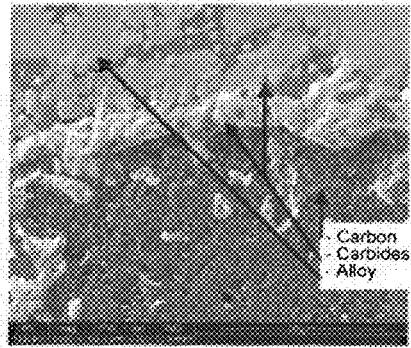

FIG. 13 is a photograph taken with the electron microscope with electron back scattering (BSE-SEM) which shows the infiltration interface of the sample M1.

The scale shown in FIG. 13 represents 20 µm.

Figure 14:
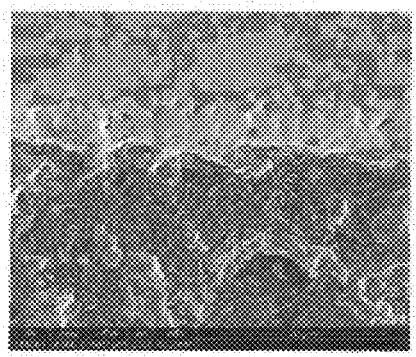

FIG. 14 is a photograph taken with the electron microscope with electron back scattering (BSE-SEM) which shows the infiltration interface of the sample M2.

The scale shown in FIG. 14 represents 20 µm.

Figure 15:
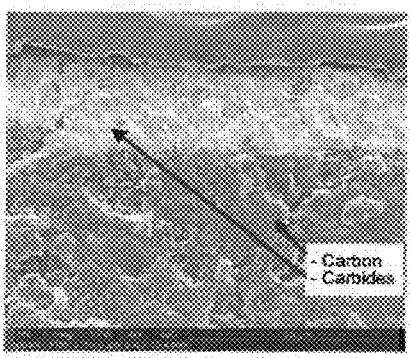

FIG. 15 is a photograph taken with the electron microscope with electron back scattering (BSE-SEM) which shows the infiltration interface of sample M3.

The scale shown in FIG. 15 represents 20 µm.

Figure 16:
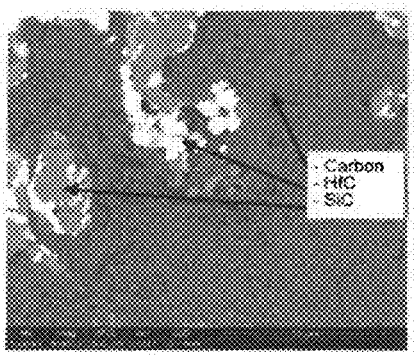

FIG. 16 is a photograph taken with the electron microscope with electron back scattering (BSE-SEM) which shows the pores of the sample M2 filled with SiC carbides (pale grey) and HfC carbides (white).

The scale shown in FIG. 16 represents 10 µm.

Figure 17:
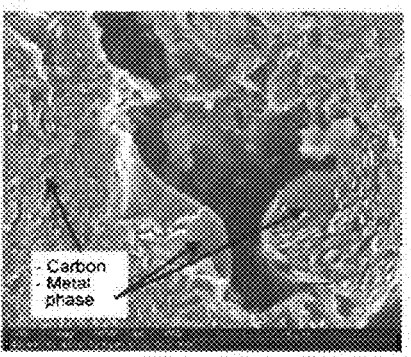

FIG. 17 is a photograph of the sample M2 taken with the scanning electron microscope with a detector of secondary electrons (SE-SEM) which shows an intra-pore residual metal phase.

The scale shown in FIG. 17 represents 5 µm.

FIG. 18 is a photograph taken with the electron microscope with electron back scattering (BSE-SEM) which shows the infiltration and the SiC/HfC carbides within the sample M3.

The scale shown in FIG. 18 represents 50 µm.

FIG. 19 is a photograph taken with the Electron microscope with electron back scattering (BSE-SEM) which shows the infiltration profile of sample M4.

The scale shown in FIG. 19 represents 100 µm.

FIG. 20 is a photograph taken with the electron microscope with electron back scattering (BSE-SEM) which shows the infiltration profile of sample A.

The scale shown in FIG. 20 represents 100 µm.

FIG. 21 is a photograph taken with the electron microscope with electron back scattering (BSE-SEM) which shows the infiltration profile of the sample M5.

The scale shown in FIG. 21 represents 100 µm.

FIG. 22 is a photograph taken with the electron microscope with electron back scattering (BSE-SEM) which shows the infiltration interface of the sample A.

The scale shown in FIG. 22 represents 100 µm.

FIG. 23 is a photograph taken with the electron microscope with electron back scattering (BSE-SEM) which shows the infiltration front of the sample A.

The scale shown in FIG. 23 represents 100 µm.

FIG. 24 is a photograph taken with the electron microscope with electron back scattering (BSE-SEM) which shows the infiltration interface of the ionically polished sample A.

The scale shown in FIG. 24 represents 10 µm.

FIG. 25 is a photograph taken with the electron microscope with electron back scattering (BSE-SEM) which shows in the sample A the SiC/HfC multilayer in a pore infiltrated at 150 µm from the surface.

The scale shown in FIG. 25 represents 5 µm.

FIG. 26 is a photograph taken with the electron microscope with electron back scattering (BSE-SEM) which shows in the sample B, a pore containing carbides and a residual metal phase.

The scale shown in FIG. 26 represents 50 µm.

FIG. 27 is a photograph taken with the electron microscope with electron back scattering (BSE-SEM) which shows in the sample C a pore containing an alloy topping the SiC and HfC carbides.

The scale shown in FIG. 27 represents 50 µm.

FIG. 28 is a photograph taken with the electron microscope with electron back scattering (BSE-SEM) which shows the infiltration interface of sample D.

The scale shown in FIG. 28 represents 1 mm.

FIG. 29 is a photograph taken with the electron microscope with electron back scattering (BSE-SEM) which shows the infiltration inside the sample D.

The scale shown in FIG. 29 represents 400 µm.

FIG. 30 is a photograph taken with the electron microscope with electron back scattering (BSE-SEM) which shows in the sample D, a pore filled with SiC and HfC carbides, and no metallic phase.

The scale shown in FIG. 30 represents 50 µm.

FIG. 31 is a photograph taken with the electron microscope with electron back scattering (BSE-SEM) which shows in the sample D, a pore filled with SiC and HfC carbides having a micro-inclusion of non-carburized metal.

The scale shown in FIG. 31 represents 40 µm.

FIG. 32 is a photograph taken with the electron microscope with electron back scattering (BSE-SEM) which shows the infiltration of $HfSi_2$ within the sample E.

The scale shown in FIG. 32 represents 1 mm.

FIG. 33 is a photograph taken with the electron microscope with electron back scattering (BSE-SEM) which shows HfC carbides topping the fibers and the surface of the sample E.

The scale shown in FIG. 33 represents 100 µm.

Figure 34:
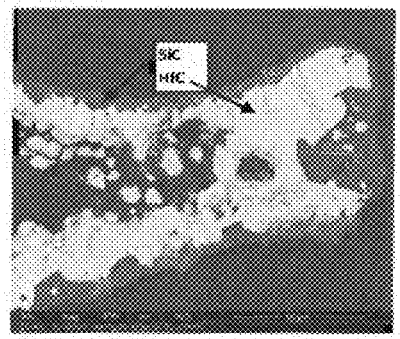

FIG. 34 is a photograph taken with the electron microscope with electron back scattering (BSE-SEM) which shows in the sample E the microstructure of the pores infiltrated after RMI with a multilayer.

The scale shown in FIG. 34 represents 10 µm.

Figure 35:
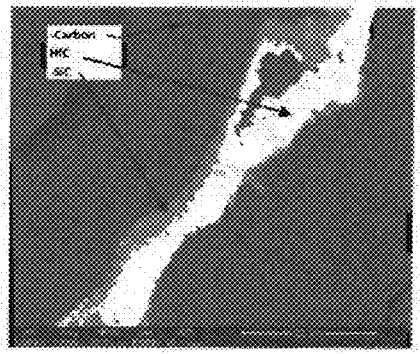

FIG. 35 is a photograph taken with the electron microscope with electron back scattering (BSE-SEM) which shows in the sample E infiltration channels.

The scale shown in FIG. 35 represents 20 µm.

Figure 36:
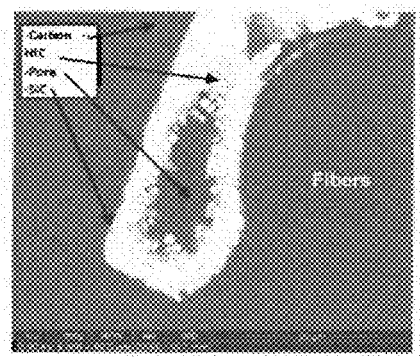

FIG. 36 is a photograph taken with the electron microscope with electron back scattering (BSE-SEM) which shows in the sample E a carburized pore comprising a closed cavity.

The scale shown in FIG. 36 represents 20 µm.

Figure 37:
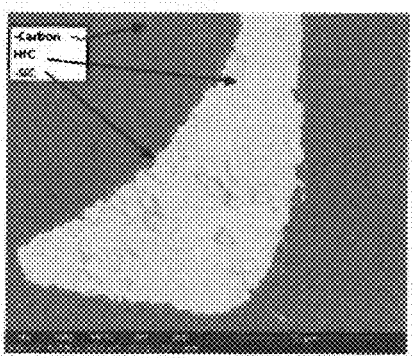

FIG. 37 is a photograph taken with the electron microscope with electron back scattering (BSE-SEM) which shows in the sample E a pore which is fully carburized without any closed cavity.

The scale shown in FIG. 37 represents 10 µm.

Figure 38:
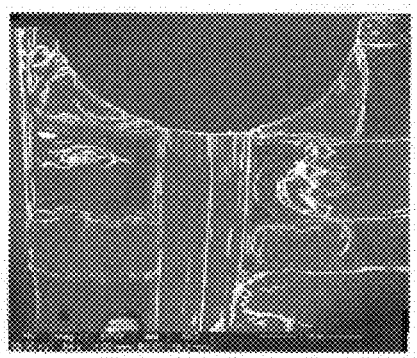

FIG. 38 is a photograph taken with the electron microscope with electron back scattering (BSE-SEM) which shows the infiltration profile of the sample F.

The scale shown in FIG. 38 represents 1 mm.

Figure 39:
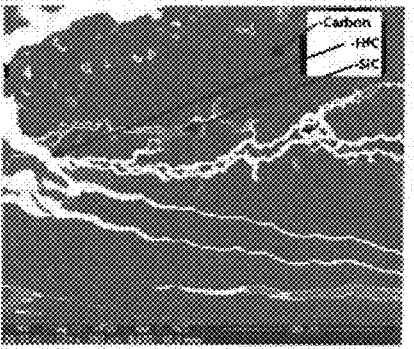

FIG. 39 is a photograph taken with the electron microscope with electron back scattering (BSE-SEM) which shows in the sample F pores and channels filled with carbides and/or covered with carbide.

The scale shown in FIG. 39 represents 100 µm.

FIG. 40 is a photograph taken with the electron microscope with electron back scattering (BSE-SEM) which shows in the sample F micropores filled in majority with SiC and micropores filled in majority with HfC.

The scale shown in FIG. 40 represents 100 µm.

FIG. 41 is a photograph taken with the electron microscope with electron back scattering (BSE-SEM) which shows in the sample F the microstructure as a multilayer of the surface and of the pores.

The scale shown in FIG. 41 represents 20 µm.

FIG. 42 is a photograph taken with the electron microscope with electron back scattering (BSE-SEM) which shows the infiltration of sample G.

The scale shown in FIG. 42 represents 400 µm.

FIG. 43 is a photograph taken with the electron microscope with electron back scattering (BSE-SEM) which shows in sample G inter-wires spaces filled with SiC/HfC carbides.

The scale shown in FIG. 43 represents 20 µm.

Figure 44:
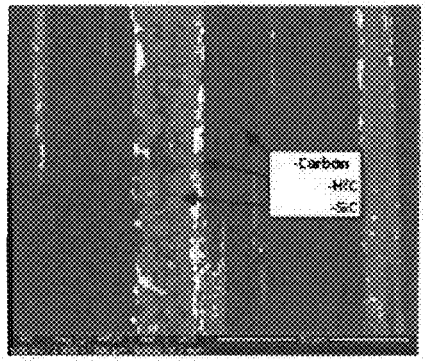

FIG. 44 is a photograph taken with the electron microscope with electron back scattering (BSE-SEM) which shows the infiltration of sample H.

The scale shown in FIG. 44 represents 50 µm.

Figure 45:
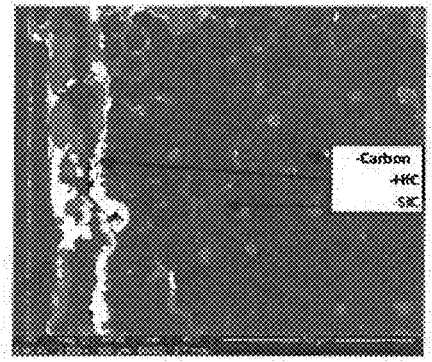

FIG. 45 is a photograph taken with the electron microscope with electron back scattering (BSE-SEM) which shows the inter-wire and inter-fibers infiltration of sample H.

The scale shown in FIG. 45 represents 50 µm.

Figure 46:
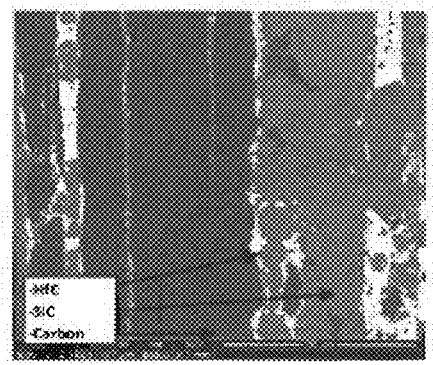

FIG. 46 is a photograph taken with the electron microscope with electron back scattering (BSE-SEM) which shows the infiltration and the spreading out of the HfC carbides of the sample H.

The scale shown in FIG. 46 represents 50 µm.

Figure 47:
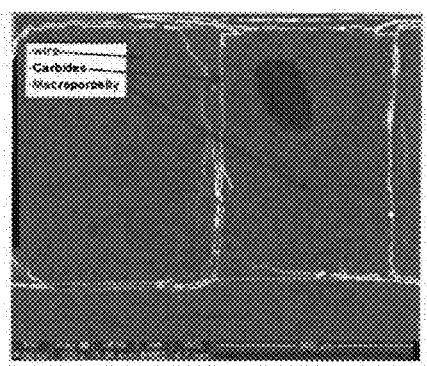

FIG. 47 is a photograph taken with the electron microscope with electron back scattering (BSE-SEM) which shows the inter-wire infiltration within the sample I.

The scale shown in FIG. 47 represents 500 µm.

Figure 48:
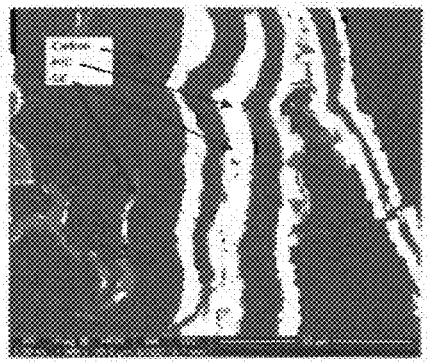

FIG. 48 is a photograph taken with the electron microscope with electron back scattering (BSE-SEM) which shows the C/SiC/HfC/SiC/C multilayer within the sample I.

The scale shown in FIG. 48 represents 30 µm.

Figure 49:
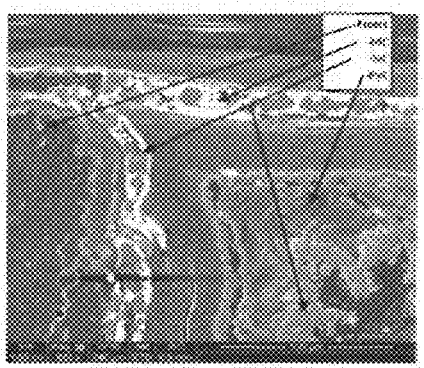

FIG. 49 is a photograph taken with the electron microscope with electron back scattering (BSE-SEM) which shows PyC and carbides layers within the sample I.

The scale shown in FIG. 49 represents 100 µm.

Figure 50:
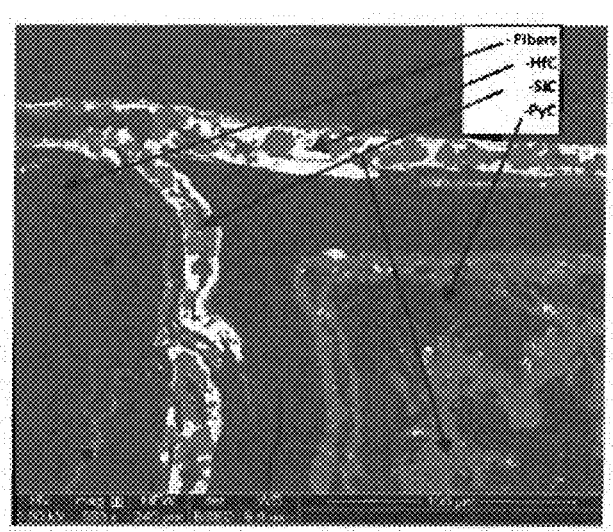

FIG. 50 is a photograph taken with the electron microscope with electron back scattering (BSE-SEM) which shows PyC and carbides layers within the sample I.

The scale shown in FIG. 50 represents 100 µm.

Figure 51:
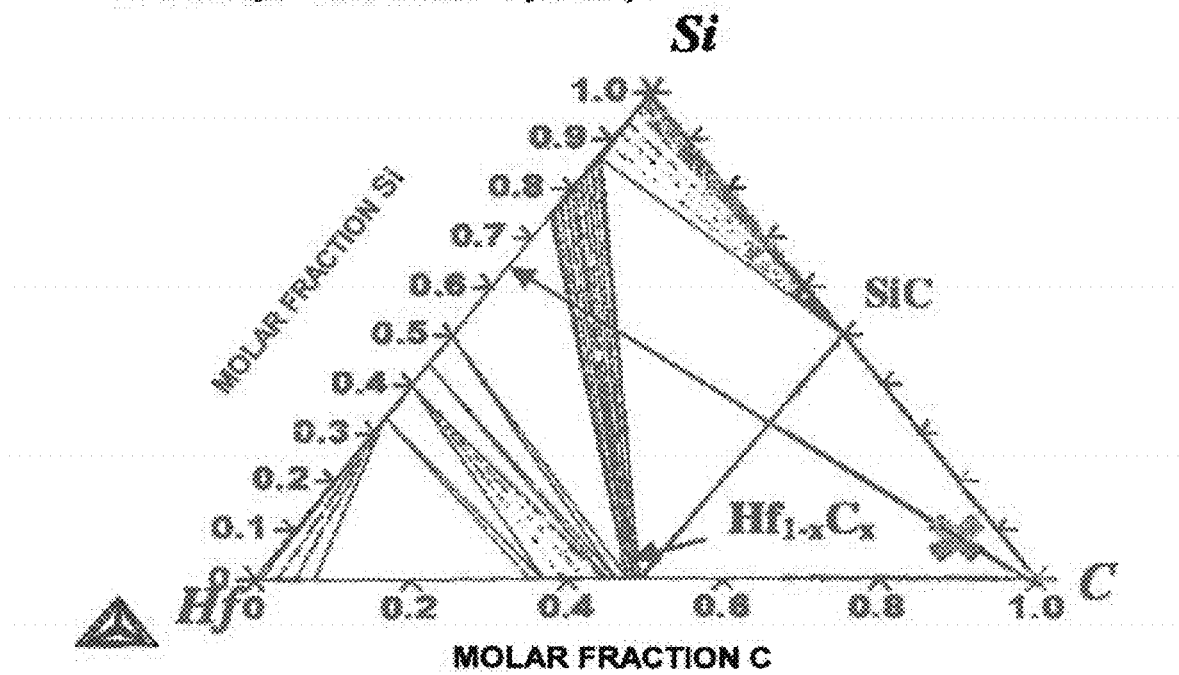

FIG. 51 illustrates the ternary diagram Hf—Si—C at 1,800° C.

Figure 52:
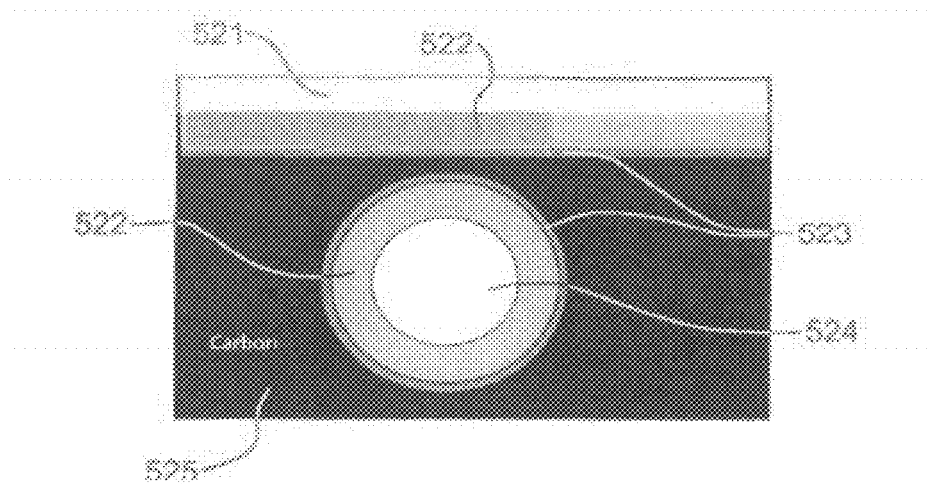

FIG. 52 is a simplified diagram of the structure observed at the surface as well as inside the pores.

Figure 53:
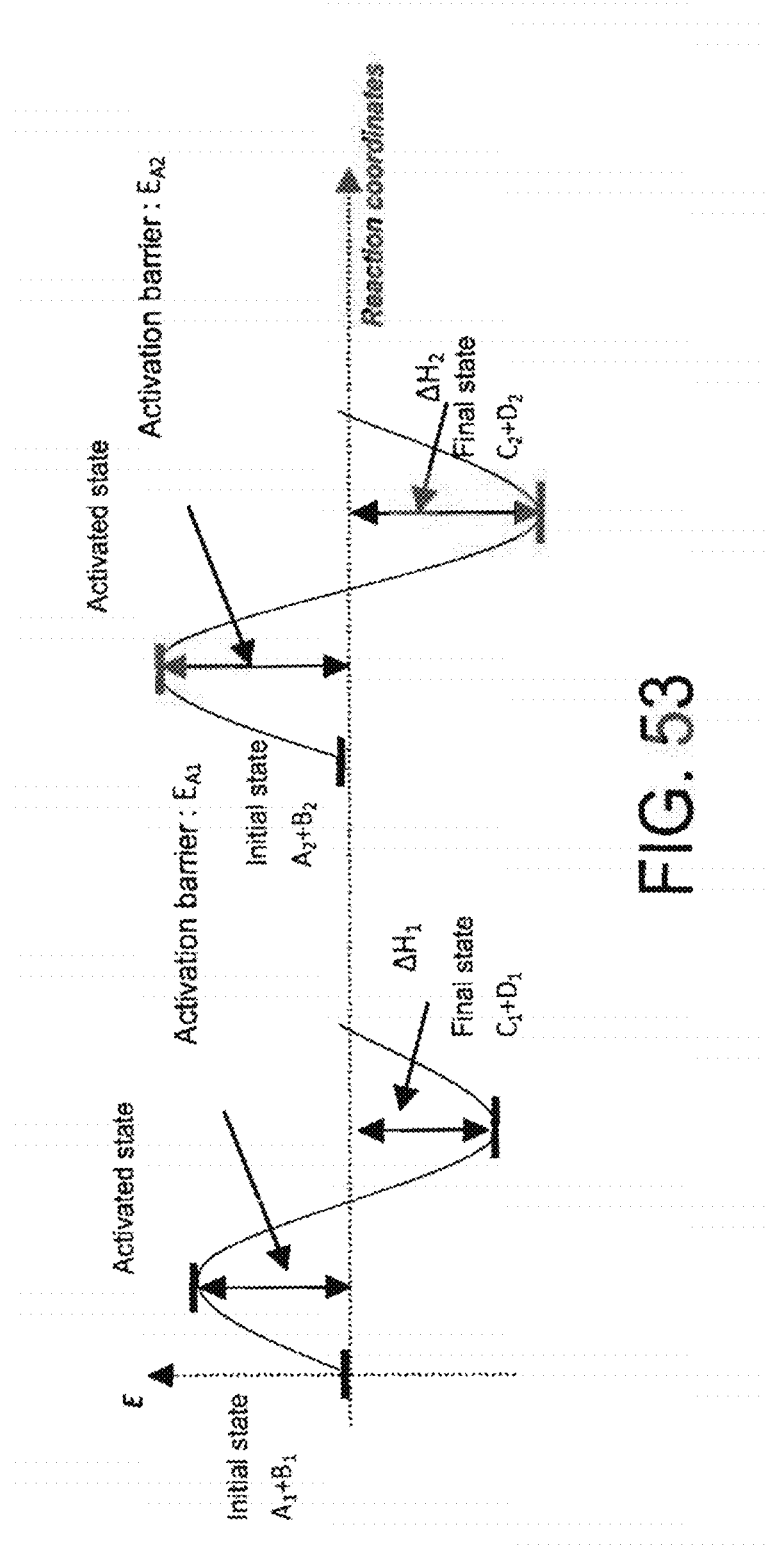

FIG. 53 is a graph which shows the activation energy of chemical reactions $A_x + B_x \rightarrow C_x + D_x$.

DETAILED DISCUSSION OF PARTICULAR EMBODIMENTS

The invention will now be described with reference to the following examples given as an illustration and not as a limitation.

1. Materials, Equipment and Methods.
1.1. Raw Materials.
a) Metal Powders

The Table below shows the metal or intermetallic compounds powders used for producing infiltration alloys.

| Powder | Supplier | Purity | Grain size |
|---|---|---|---|
| Hf | Alfa Aesar ® | 99.6% (except Zr) 3.5% nominal of Zr | $d_{50}$ = 44 µm |
| Si | Alfa Aesar ® | 99.9% | $d_{50}$ = 10 µm |
| $HfSi_2$ | Neyco ® | 99.5% | $d_{50}$ = 44 µm |
| $ZrSi_2$ | Neyco ® | 99.5% | $d_{50}$ = 44 µm |

The alloys used for producing the reactive infiltrations were synthesized from these powders.

The powders are mixed and then compressed under a force of 2 metric tons into discs of a diameter of 5 mm, by means of a tableting machine Specac®.

The discs are then fractionated into several pieces which are used for reactive infiltration.

b) The Carbon-Containing (Carbonaceous) Pre-Forms

Two types of pre-forms were used: porous pellets, discs of graphite and C/C composite materials.

The open porosities were determined by measuring the buoyancy force.

On certain pre-forms, a drill hole was made in order to contain the spreading of the alloy on the upper face of the pre-form during reactive infiltration. The holes were made manually via a mini-drill Dremel® and a dip with a diameter of 3 mm.

Graphite Discs

Two series of graphite discs (pellets) from the company Mersen® were used for producing infiltrations.

The discs have a diameter of 10 mm and a height of 3 mm, i.e. a volume of 235 mm$^3$.

The grade 2175 (FIG. 2) is an isostatic graphite disc for which the average open porosity is 12%. The size of the pores is comprised between 1 and 20 μm.

The grade 6103 (FIG. 3) is an extruded graphite disc for which the average open porosity is 13.5%. The pores are irregular and their size is comprised between 1 μm and several hundred microns.

C/C Composite Materials.

Reactive infiltrations were also made on 2D and 3D C/C composite materials of the Kalamazoo type provided by CEA Le Ripault.

These composites were obtained from an orthogonal 2D or 3D pre-form.

The pre-form is first of all made by weaving ex-PAN fibers.

In the 3D pre-form, the fibers are grouped in dense filaments and occupy 44% of the volume of the pre-form. The inter-tread macropores are parallelepipeds with a size of several hundred micrometers. They are only interconnected through their apex [FITZ 1998].

As the pre-form has been woven, it is pre-densified by burnout.

For this, the pre-form is maintained in a carbonaceous fabric and placed in a reactor filled with a hydrocarbon. The temperature is brought to 1,100° C. As soon as 800° C., hydrocarbon cracking reactions begin. Denser aromatic species than the liquid are then synthesized. The temperature of 1,100° C. corresponds to the deposition of dense and graphitizable pyrocarbon on the fibers. The duration of the plateau depends on the pre-form used and on the desired density [DEKE 2010].

During this process, the hydrocarbons boil and change color.

The pieces of "Kalamazoo 2D" used have a volume comprised between 350 and 450 mm$^3$ and an average open porosity of 9.5%, while the Kalamazoo 3D have an open porosity comprised between 15 and 20% (see FIGS. 4 and 5).

1.2. Tools for Studies.

a) 2,000° C. Heat Treatment Furnace/Oven

The C/C composites used, having been pre-densified by burnout at a maximum temperature of 1,100° C., many organic residues are present in the pre-forms.

As the reactive infiltrations take place at temperatures above 1,600° C., it is necessary to carry out beforehand a heat treatment in order to remove the residues which may limit or prevent smooth progress of RMI.

For this, a heat treatment induction furnace was used. The samples are positioned in a graphite crucible at the centre of the induction coil, and the chamber is then kept in a secondary vacuum by means of a rotary vane pump assisted by a turbo-molecular pump.

Once the secondary vacuum is attained, the heat treatment program is initiated. This heat treatment comprises thermal heating and cooling ramps of 10° C./min and a 4 hour plateau at 1,800° C.

b) High-Temperature Wetting Bench

All the reactive infiltrations in liquid phase carried out during this study were carried out on a high-temperature wetting bench.

FIG. 6 shows the different elements of the high temperature «HT» wetting bench.

This wetting bench comprises a marble tray (61) on which is pressed an induction oven with cold walls comprising a dual-walled chamber (62), provided with two windows (63, 64) allowing pyrometric sighting by means of a device (Ircon MODLINE 5®) (65), as well as image capture by means of a CCD camera provided with an objective (66). In front of the window (64) a lamp with optical adjustment is also provided (67). The oven is also equipped with a sample holder (68), with a discharge valve (69) and a pressure gauge (610).

The bench further comprises a high-frequency generator (Five Celes MP 3®) (611) with a power of 12 kW. The handling bench is qualified for maximum temperatures of 1,800° C. This temperature is not limited by the HF generator (611) but by safety measures and the system for cooling the induction furnace.

The induction coil is connected to a "HF" box (612) via current supply lines (613).

The cooling of the walls of the oven is ensured by a cold water circuit.

The oven may operate under a static argon atmosphere, with argon sweeping, brought through a duct (615) provided with an argon purifier (614) or else in a primary vacuum established by means of a primary vacuum pump (616). The generator (611) having great power, the maximum temperature of 1,800° C. is attained within 40 seconds, which is equivalent to a temperature rise ramp of 2,700° C./min. Cooling is not linear: as soon as the end of the plateau, the temperature will decrease by 800° C. within 30 seconds and will then slow down.

The sample is placed in a carbon susceptor, itself positioned at the centre of the induction coil when the oven is closed. The sample should have a maximum height of less than 7 mm and a diameter of less than 14 mm.

The pre-forms are directly supplied with metal, by placing compact pieces of powder of about 8 to 12 mm$^3$ above the pre-form. This volume is limited by the dimensions of the susceptor.

It should be noted that the pyrometer (65) was recalibrated during the investigation, as well as the temperature deviation between the set value and the temperature in the centre of the susceptor was corrected and is less than 3° C. Recalibration was carried out by studying the melting and the wetting of the copper and of the silicon on the carbon.

c) Autoclave Oven for Pitch Pyrolysis

In order to produce a deposit of Pyrocarbon PyC on certain samples, impregnation and pyrolysis of pitch was carried out in an autoclave under an atmosphere of dinitrogen by following the program shown in FIG. 7.

The pitch used is 110 M from the supplier Rutgers®. Pyrolysis is conducted under moderate pressure, with a low temperature rise rate for limiting foaming of the pitch.

The impregnation takes place at 200° C. in a static vacuum: the pitch having been melted as soon as 150° C., the pre-forms absorb it. The dinitrogen pressure is then gradually increased up to 5 MPa in order to not only improve the penetration of the liquid pitch into the sample but also to contain the molten pitch in the pre-form during the rise in temperature. With temperature, the pressure will increase up to 10 MPa.

Once pyrolysis is carried out, it is necessary to remove the heteroatoms from the sample. For this, carbonization is carried out in a tubular oven with dinitrogen sweeping. The sample, positioned in an alumina crucible, is heated at a rate of 10° C./min up to 600° C., and then at a rate of 5° C./min and maintained at 1,100° C. for 5 h.

1.3. Preparation for Characterization

Once the reactive wettings are completed, it is necessary to prepare them for the different characterization tools.

For this, the samples are in a first phase, longitudinally cut with respect to the infiltration direction by means of a mini-chainsaw with a diamond disc or else with a mini-saw with a diamond wire.

After the cutting out, half of these samples are coated with an epoxy resin.

For this, the product available from Struers® under the name of Specifix 2® is used, which consists of a liquid resin and of a liquid hardener which has to be mixed in ratio of 7:1 respectively.

Once the solution is homogenized for 5 minutes, the latter is placed for few minutes in a device for impregnation in vacuo, available from Struers under the name of Epovac® which allows discharging of the air present in the mixture by applying vacuum.

The solution is then poured into the hollow pad or mould containing the sample to be coated, the latter having the face intended for observation against the bottom.

A second passage into the device for impregnation in vacuo gives the possibility of removing the air bubbles which might have been able to interfere in the resin during transfer of the resin. The resin pad with the sample is then left at room temperature for 12 hours, so that the resin completely polymerizes and thus hardens.

As the samples have been coated, it is necessary to carry out mechanical polishing not only for removing the excess resin which is on the surface to be observed of the sample, but also for leveling this surface in order to facilitate characterization of the samples with optical microscopes.

Polishing is initiated manually on a SiC abrasive disc of grain 120, and is then continued on a Struers Tegra Force 5® polishing machine according to a mechanical polishing range predefined by the laboratory for C/C materials comprising carbides.

The times and forces used in this range were adapted for the samples for which the substrate was formed with a graphite disc in order to prevent detachment and reinsertion of certain HfC carbides formed in the substrate.

TABLE 3

Summary of a sequence followed on the Struers Tegra Force 5 polishing machine
Summary of fine polishing

| Disc used | Duration | Force | Intake |
|---|---|---|---|
| Grid of 220 grit | 4' | 25 N | Water |
| Grid of 600 grit | 3'30" | 25 N | Water |
| Grid of 1200 grit | 3'30" | 25 N | Water |
| Sheet 9 µm | 6' | 20 N | Diamond-containing liquid 8 |
| Sheet 3 µm | 5' | 20 N | Diamond-containing liquid 10 |
| Sheet 1 µm | 4' | 20 N | Diamond-containing liquid 12 |

Between each polishing passage, the coated samples are cleaned in a beaker filled with water with passage for one minute in the ultrasonic bath.

In order to observe the reaction interfaces as accurately as possible, certain samples were subject to ionic polishing by means of a Cross Section Polisher SM-09010 from Jeol®.

1.4. Tools and Methods for Characterization

The samples were observed with optical microscopy and electron microscopy. The optical microscope used is an inverted microscope from Reichert-Jung® MeF3.

The major part of the observations was carried out with the scanning electron microscope (SEM) Quanta 400F®.

This SEM uses a field emission gun and has a detector of secondary electrons, a detector of back scattered electrons, and an EDXS detector.

The field emission gun gives the possibility of operating with low accelerating voltages (<6 kV) without luminosity being attenuated like in SEMs with tungsten filament.

The secondary electrons are electrons from the core of the atoms of the sample. The latter are attracted by the detector placed on the side of the sample which «captures» them via a biased grid. The electrons are then transformed into photons by a photomultiplier and then again transformed into electrons, which allows purification of the signal. The contrast is controlled by the number of dynodes within the photomultiplier; it gives no information on the chemical composition.

The back-scattered electrons are re-emitted as a result of elastic interactions; they therefore have less energy (50 eV). This observation technique gives the possibility of having information on the chemical composition of the sample. Indeed, as heavy elements interact more with the incident beam, they appear lighter.

The EDXS detector allows analysis of the X radiation from the sample. This technique allows semi-quantification of the chemical composition of the investigated sample by means of the specific emission energies of each chemical element.

The software used for EDXS analysis is the software EDAX Genesis®.

1.5. Experimental Parameters

This part summarizes the different parameters used during reactive infiltrations in a liquid phase:

| | Name of the sample | | | | |
|---|---|---|---|---|---|
| | M1 | M2 | M3 | M4 | M5 |
| Substrate | Disc 2175 | Graphite 2175 | Disc 2175 | Disc 2175 | Disc 2175 |
| Mixture used (atomic %) | 68Si32Hf | 72Si28Hf | 82Si18Hf | 66Si34Hf | 75Si25Hf |
| Preparation powders | Hf + Si | Hf + Si | Hf + Si | Hf + Si | $HfSi_2$ + Si |
| Maximum infiltration temperature | 1750° C. | 1750° C. | 1750° C. | 1700° C. | 1700° C. |
| Plateau period | 5 min | 5 min | 5 min | 5 min | 5 min |

-continued

| | Name of the sample | | | | | | | | |
|---|---|---|---|---|---|---|---|---|---|
| | A | B | C | D | E | F | G | H | I |
| Substrate | Disc 2175 | Disc 6103 | Disc 6103 | Disc 6103 | C/C 2D | C/C 3D | C/C3D | C/C 3D | C/C 3D |
| 1st compound used | $HfSi_2$ | $HfSi_2$ | $HfSi_2$ | $HfSi_2$ | $HfSi_2$ | $HfSi_2$ | $HfSi_2$ | $HfSi_2$ | $HfSi_2$ |
| 1st RMI Tmax | 1,700° C. | 1,600° C. | 1,800° C. | 1,800° C. | 1,800° C. | 1,800° C. | 1,800° C. | 1,800° C. | 1,800° C. |
| 1st plateau duration | 5 min | 5 min | 2 min | 15 min | 5 min | 15 min | 15 min | 15 min | 15 min |
| 2nd compound | | | | NC | | | | Si | Si |
| 2nd RMI Tmax | | | | | | | | 1,600° C. | 1,600° C. |
| 2nd plateau duration | | | | | | | | 5 min | 5 min |

NB: "Disc" means a disc (or pellet).

The volume of metal used is comprised between 20% and 30% of the volume of open porosity of the substrate; this volume is limited by the dimensions of the graphite susceptor of the wetting bench, as well as by the size of the pre-forms used.

2. Results.

2.1. Selection of the Infiltration Alloy.

The main constraint in the selection of the alloy is here the maximum temperature of use of the wetting bench which is 1,800° C.

It was seen above that the reactive infiltration in a liquid phase into C/C materials was mainly developed for synthesizing SiC from silicon.

a) Selection of the Binary System

The behavior of ultra-refractory elements Hf, Ta and W being similar, the experiments carried out within the scope of this study are focused on the hafnium element.

Accordingly, the only studied binary system is the Hf—Si system.

Two binary diagrams of the Hf—Si system, extracted from documents of GOKH 1989 and of ZHAO 2000, are shown in FIGS. 8A, 8B.

The temperatures for melting hafnium-rich phases: on the left of the intermetallic compound HfSi, are greater than 1,800° C.

Thus, only the compositions on the right of HfSi may be used within the scope of this study.

It is found that this right portion of the phase diagram has been clearly less studied in the literature as the other one, which induces a quite large uncertainty on the temperatures of liquidus.

The use of alloys consisting of at least 50% Hf with a maximum melting temperature of 1,800° C. implies that the only phases which may be formed at equilibrium upon cooling are: $HfSi_2$, HfSi and a solid solution of silicon.

The silicon forms with the carbon, a single carbide which is a defined compound having an incongruent melting temperature of more than 2,700° C.

Hafnium forms a single carbide with an existence domain: $Hf_{1-x}C_x$, x being comprised between 34.5 and 49.5 atomic %.

The enthalpies for forming the carbides SiC and HfC at 25° C. are $-68$ kJ·$mol^{-1}$ and $-209.6$ kJ·$mol^{-1}$ [VOIG 2011], respectively.

The ternary diagram of the C—Hf—Si system at 1,300° C., shown in the document of [RUDY 1969] (FIG. 9), may be used for predicting the phases which will be coexistent at equilibrium after reactive infiltration.

Only the intermetallic compound hafnium disilicide: $HfSi_2$ may be at equilibrium in the joint presence of SiC and of HfC.

The silicon may be at equilibrium with silicon carbide.

In the same way, the intermetallic compound HfSi may be at equilibrium with the carbide HfC and with $HfSi_2$.

It will therefore be necessary subsequently to pay a particular attention to the absence of a residual metal phase rich in silicon or of HfSi after the RMI treatments.

b) Studies of Ternary Alloys

In order to increase the percentage of hafnium in the alloy, different ternary systems have been contemplated. From among them:

The C—Hf—Si system, i.e. the integration of carbon powder into the powered Hf—Si alloy, has been mentioned, since the carbon would have not only a role of a smelting agent, but also of a limiting agent for the formation of intermetallic compounds.

However, the reactivity of hafnium and silicon with carbon is too significant, the carbon would therefore have instantaneously reacted with the molten alloy in order to form carbides.

Further, the carbon would limit the infiltration of the liquid in the pre-form by concentrating the reaction at the surface of the pre-form.

This system is therefore of interest for forming a carbide at the surface of a carbonaceous material, but seems unsuitable for reactive infiltration.

The Cr—Hf—Si system. The chromium forms carbides and silicides, for which the melting temperature is less than 2,000° C., this system was therefore not retained.

The Cu—Hf—Si system. Copper is a smelting element which does not form any carbide but only silicides. Accordingly, it may limit the formation of SiC, HfSi and $HfSi_2$, to the benefit of forming HfC. The silicides formed by copper have a very low melting point and low wetting with carbon, however the dissolution of the latter is not easily achievable. Indeed, a simple heat treatment will not give the possibility of removing them if they are incorporated to the core of the sample, covered or intertwined with grains of the various carbides. This system was therefore not retained.

The Hf—Ni—Si system. Nickel silicides have a too low melting temperature ($T_m$=1,010° C.) and wet carbon, it is therefore difficult to remove them from the pre-form, once the reactive infiltration has been carried out. This system was therefore not retained.

The systems Hf—Si—V and Hf—Si—Y. Vanadium and yttrium form silicides having melting temperatures slightly below 2,000° C. and wet carbon. This system was therefore not retained.

In spite of the study of [YE 2012], the Hf—Si—Zr system was not studied since zirconium does not significantly reduce the melting temperature of the infiltration alloy. Thus the use of a ternary alloy for reducing the melting temperature of the infiltration alloy and increasing the hafnium proportion does not seem to be easily feasible.

Only the system C—Hf—Si seemed of interest, if the desire was to only produce a carbide deposit or layer at the surface of a pre-form.

Accordingly, the only system actually studied herein is the Hf—Si binary system.

2.2. Determination of the Optimum Composition from the Hf—Si System.

As the Hf—Si binary system was selected, it is necessary to determine what is the optimum composition for achieving reactive infiltration in a liquid phase.

From the Hf—Si phase diagrams, different mixtures of metal powders were produced with the purpose of obtaining infiltration as most homogenous as possible, having the minimum of residual metal phase after RMI while having a consequent hafnium proportion in the alloy in order to form as much HfC as possible.

The Table hereafter summarizes the different selected compositions and their melting temperatures.

temperature and time gave the possibility of carrying out infiltration down to a depth of 150 μm. This infiltration depth is equivalent to the one visible on samples M2 and M3. Thus, in this case, the infiltration depth does not seem to depend on the composition of the alloy.

The mixture M2 is more spread out on the surface of the sample than M1. The alloy is biphasic, the phases have the same composition as those specified for 68Si32Hf. Finally, the mixture M3 is the one which was the most spread out, the alloy is also biphasic.

FIGS. 13, 14 and 15 show for the three samples, the presence of a carbide layer HfC at the surface of the graphite pre-form. The thickness of this HfC carbide layer seems to vary with the concentration of hafnium of the initial alloy: the richer is the composition in hafnium, the more the layer seems to be thin.

However, as the sample M3 only includes a very slight amount of residual alloy at the surface of the pre-form, no HfC carbide is included in this alloy, unlike the samples M1 and M2. (FIG. 13 and FIG. 14).

Inside the graphite discs, the alloys reacted so as to form SiC and HfC carbides. These phases were analysed by peaking EDXS.

These carbides, visible in FIG. 16 are present in the three studied samples. In the samples M2 and M1, certain pores at the infiltration front contain residual metal phases (FIG. 17).

An EDXS analysis determines that this phase comprises about 97 atomic % of silicon and 3 atomic % of hafnium, it is therefore in equilibrium with SiC. On the sample M3, no metal phase was observed.

TABLE 4

Summary of the selected Hf—Si compositions and of their melting temperatures

| | Composition of the mixture (atomic %) or compound | | | | | |
|---|---|---|---|---|---|---|
| | M4: 66Si34Hf | M1: 68Si32Hf | M2: 72Si28Hf | M5: 75Si25Hf | M3: 82Si18Hf | A: $HfSi_2$ |
| $T_{melting}$ (° C.) [GOKH 1989] | 1710 | 1640 | 1520 | 1470 | 1420 | 1543 |
| $T_{melting}$ (° C.) [ZHAO 2000] | 2080 | 2000 | 1900 | 1700 | 1500 | 1543 |

The reactive infiltrations shown in this portion were all produced on the same substrate: discs (pellets) of graphite 2175.

a) Study of the Infiltrations Produced from Hf and Si Powders.

In a first phase, only the compositions (atomic %) 68Si32Hf (M1), 72Si28Hf (M2), and 82Si18Hf (M3) were compared.

These three compositions were prepared from mixed and compacted hafnium and silicon powders. The infiltration took place for 5 minutes at 1,750° C., the time and temperature parameters being arbitrarily set.

FIGS. 10, 11, and 12 show the infiltration profiles of the three alloys M1, M2, and M3, produced from hafnium and silicon powders.

The composition M1 did not entirely melt, however the residual metal is biphasic. The EDXS analysis gave the possibility of determining that the clear phase comprise 30% (atomic %) of hafnium and the remainder of silicon, which may be associated with the formation of the $HfSi_2$ phase. The dark phase comprises more than 98% of silicon. This breaking down into two phases is in agreement with the binary diagrams Hf—Si shown in FIG. 10. The reaction In the three samples, the distribution of hafnium within the infiltration is very heterogenous (FIGS. 10, 11 and 12): rich areas and other ones depleted in heavy elements are visible, while the infiltration and the concentration of silicon (in light grey) are horizontally regular.

The infiltration of the mixture 82Si18Hf seems all the same more homogenous than for the other two samples (see FIG. 18).

This observation therefore led to producing new infiltrations from silicon powder and $HfSi_2$, in order to study whether this heterogeneity came from the use of hafnium powder which is not instantaneously dissolved during the rise in temperature.

b) Study of the Infiltrations Produced from $HfSi_2$ and Si Powders

The study of the three previous samples revealed that the use of mixed hafnium and silicon powders and compacted did not allow entire dissolution of the hafnium in the liquid phase during the short plateau of reactive infiltration temperature.

Further, the dissolution of the hafnium being carried out during the reactive infiltration, the dispersion of Hf in the infiltration is very heterogenous: there are areas which are more concentrated than others in hafnium in the pre-form if an Hf grain was rapidly dissolved above this area.

From these observations, the use of $HfSi_2$ was contemplated not only for producing the alloys but also as an intermetallic infiltration compound.

$HfSi_2$ is an intermetallic compound, for which the melting temperature is 1,543° C. and the formation enthalpy at 25° C. is −65 kJ·mol$^{-1}$ [ZHAO 2000].

The compositions 66Si34Hf, 75Si25Hf (atomic %) and the stoichiometric compound $HfSi_2$ were compared. The composition 66Si34Hf was prepared from hafnium and silicon powders. The composition 75Si25Hf was prepared with $HfSi_2$ and Si powders. The infiltration took place for 5 minutes at 1,700° C.

FIGS. 19, 20, and 21 show the infiltration made on the three samples M4, A, and M5. The hafnium distribution within the sample A (FIG. 20) seems to be the most homogenous. The mixtures M4 and M5 exhibited like the three samples studied earlier, a large disparity in the hafnium distribution in the carbon pre-form.

Thus, the use of a mixture of powders, in the proportions of the alloys, not homogenized by thermal pretreatment causes significant heterogeneity of the infiltrated elements in the carbon pre-form.

The three samples have the same maximum infiltration depth of 290 µm to within 5 µm. This maximum depth doubled with respect to the samples of the previous portion by means of the drill hole made on the discs for containing the spreading out of the metal. As the three depths are similar, the alloys used here are not those which limit infiltration.

If the compound $HfSi_2$ is of interest for homogenizing the infiltration, it also allows maximization of the hafnium proportion, the infiltrating reagent to 33%, while having a single melting temperature of only 1,543° C., while the liquidus temperature according to the Hf—Si phase diagrams (FIG. 8) of the equivalent alloy 66Si34Hf (atomic %) is comprised between 1,710° C. and 2,080° C.

The stoichiometric compound $HfSi_2$ is therefore the compound in the compacted powder form the most suitable for achieving reactive infiltration in a liquid phase.

2.3. Results of $HfSi_2$ RMIs on Graphite Discs (Pellets).

a) Sample A: $HfSi_2$ on a Graphite 2175 Disc at 1,800° C. for 5 Minutes.

FIG. 22 shows an overall view of the infiltration of sample A. The maximum infiltration depth is 295 µm. The hafnium infiltrated less deeply than silicon: the major portion of the visible heavy elements is located between 0 and 160 µm deep. Biphasic residual metal is visible at the surface of the sample, an EDXS analysis gave the possibility of determining that the pale phase comprised about 55 atomic % of Si and 45 atomic % of hafnium, which is close to the stoichiometric compound HfSi. The dark phase consists of 95 atomic % of silicon and 5 atomic % of hafnium. Angular phases are visible at the surface of the disc: a regular layer at the carbon/metal interface, as well as small crystals embedded in the residual metal. An EDXS analysis showed that these are HfC grains. Two phases are visible in the infiltrated pores of the disc: a light phase and a grey phase. The light phases correspond to HfC carbides, the grey phases to SiC carbides. No residual metal phase is observable in the disc.

FIG. 23 shows the infiltration front of the sample A. Non-infiltrated pores are visible at the bottom of the micrograph while pores filled with carbides are visible at the top. Most of the infiltrated pores are here covered or filled with SiC carbide.

In order to observe in more detail the morphology and the microstructure of the produced elements during reactive infiltration, ionic polishing was carried out on sample A.

FIG. 24 shows the infiltration interface of the ionically polished sample A. The layer at the surface of the disc described earlier is visible: it is regular, with a thickness comprised between 6 and 10 µm, and consisting of HfC carbide. This carbide layer is present over the whole infiltration surface, between the pre-form and the residual metal. The pores close to the surface are nearly entirely filled, with SiC and HfC carbides. The carbides adhere with the carbon: no separation is visible. The grains of the HfC carbides have a size generally comprised between 0.5 and 5 µm. Within the infiltration, the SiC carbide grains have a size varying between 1 and 15 µm. Certain visible pores have residual cavities, the diameter of which does not exceed 500 nm.

Careful observation of the limits between the carbon and the HfC carbides, in FIG. 24, shows the presence of an SiC layer separating the carbon from the HfC carbides. This SiC layer, with a thickness comprised between 50 nm and 500 nm is present at all the carbon/HfC interfaces, whether this is at the surface of the pre-form or within the infiltrated area, as shown in FIG. 25.

b) Sample B: $HfSi_2$ on a Graphite 6103 Disc at 1,600° C. for 15 Minutes.

FIG. 26 shows a pore of the sample B with an average width of 60 µm. A lumpy phase is visible over the whole periphery of the pore: this is a carbide layer with a thickness of 10 µm.

EDXS analysis allowed identification of these carbides as being HfC for the white grains and SiC for the grey grains. An SiC layer, with a thickness comprised between 50 nm and 500 nm, is present at the interface between the carbon and the HfC carbides. A hafnium-rich metal phase tops the carbide layer described earlier. The EDXS analysis indicates that this phase consists of about 55 atomic % of silicon, 42 atomic % of hafnium and 3 atomic % of carbon. Thus, dissolved carbon is present in the metal phase which is very close to the stoichiometric compound HfSi. This compound according to the ternary diagram C—Hf—Si at 1,300° C. is at equilibrium with HfC and $HfSi_2$. The temperature of 1,600° C. therefore does not seem to be sufficient for avoiding the presence of residual metal phases in the discs 6103.

c) Sample C: $HfSi_2$ on a Graphite 6103 Disc at 1,800° C. for 2 Minutes.

FIG. 27 shows a pore similar to the one shown for sample B, FIG. 26. The observed phases are the same: HfC and SiC carbides, as well as a metal phase. However the latter is clearly less substantial, while the carbides have a larger size. An SiC layer is present between the HfC carbides and the carbon, further the carbides do not exhibit any de-cohesion with the carbon.

d) Sample D: $HfSi_2$ on a Graphite 6103 Disc at 1,800° C. for 15 Minutes.

FIG. 28 shows an overall view of the infiltration of the sample D. The discs 6103 have pores of micro- and macroscopic size. The surface of the sample is covered with a regular layer of HfC carbide, the average thickness of which is 20 µm. Also, the macropores (for which the average diameter is greater than 60 µm) near to the surface are here for a large part filled with the formation of many HfC carbides. The macropores present more deeply are not filled with carbides, but are only covered with a layer of HfC carbides, the average thickness of which is 15 µm.

FIG. 29 shows a more detailed view of the infiltration inside the sample D. A behavior difference according to the size of the pores may be perceived. Indeed, the infiltration micropores and microchannels are in majority filled with SiC, while the HfC carbides are in majority located on the pores of large diameter.

FIG. 30 shows a pore with an average width of 60 µm. SiC carbides are visible on the periphery of this pore. The centre of the porosity is then filled with HfC carbides. Residual cavities are visible between the grains of the HfC carbides, but no residual metal phase is present.

FIG. 31 is in contrast with the previous one and shows, in a pore having the same morphology as the one of the previous figure, a metal inclusion comprised in an SiC carbide. This inclusion consists of 3 phases: 60% of a dark phase which consists of about 97 atomic % of Si and 3 atomic % of Hf, 30% of a pale phase consisting of about 45 atomic % of hafnium, 50 atomic % of silicon and 5 atomic % of C, and 10% of an intermediate grey phase consisting of 88 atomic % of Si, 8 atomic % of Hf and 4 atomic % of C.

The study of the ternary diagram C—Hf—Si at 1,800° C. reveals that the pale metal phase is in equilibrium with the HfC and SiC carbides at this temperature. However, it is not in equilibrium during cooling, as shown by the ternary diagram at 1,300° C. (FIG. 9). The composition of the phases was analyzed with EDXS.

On the whole sample D, an SiC layer is observed at the interface between the carbon and HfC.

2.4. Results of $HfSi_2$ RMIs on Carbon/Carbon Materials.

As the goal of this study is the production of ultra-refractory carbides by RMI within carbon/carbon materials, reactive infiltrations on these materials were carried out with $HfSi_2$ at 1,800° C.

a) Sample E: $HfSi_2$ on a 2D C/C Composite at 1,800° C. for 5 Minutes.

The first infiltrations on C/C composites took place on 2D pre-forms. They were made with $HfSi_2$ for 5 minutes at 1,800° C.

FIG. 32 shows the infiltration of $HfSi_2$ within a 2D composite. The sample was impregnated over the whole of its height (5 mm) during RMI, and no residual metal remains at the surface of the discs. An HfC carbide layer with a thickness from 10 to 15 µm tops the infiltration macrochannels and the surface of the pre-form. Some horizontal heterogeneity of the impregnation is observable: certain channels or certain porosities seem to have been wetted with less liquid than other ones. The HfC carbides are in majority concentrated in the upper half of the infiltration. No metal phase is observable.

FIG. 33 shows that the accessible carbon fibers are entirely covered with a regular layer of HfC carbide. The HfC grains making up this layer have a size comprised between 1 and 5 µm. The macroporosity at the surface of the area visible in this figure is filled with a layer of 50 µm of HfC carbide having germinated at the surface. The consumed carbon for forming the carbides is from the graphite layer deposited at the surface of the fibers during graphitization, the latter appear intact and have to retain their mechanical properties. Also, the carbides are coherent with the carbon: no shrinkage, setback, no de-cohesion of the carbides with respect to the carbon were observed in the sample.

FIG. 34 shows an inter-fiber pore of the sample E. An SiC layer is clearly distinguished, present between the carbon and the HfC carbides, the latter is present in the whole sample and has a thickness comprised between 50 nm and 750 nm.

FIG. 35 shows infiltration channels between the graphite sheets of the sample E. The ratio of the proportion of SiC carbides relatively to HfC seems to depend on the diameter of the channels and on the infiltration pores. Thus in this figure, the small channel, located in the upper portion, has a much larger SiC/HfC ratio than the infiltration arm below which is wider.

FIG. 36 shows an inter-fiber pore for the maximum width is 15 µm and the inlet diameter of 10 µm, which is relatively large. The pore is filled with HfC carbides, and an SiC layer is present at the interface between the carbon and HfC. A residual cavity at the centre of the pore is visible, while the inlet of this pore is blocked by HfC carbides.

FIG. 37 shows a pore of a size quasi similar to the previous one: the maximum width is 15 µm, however the inlet diameter of the pore is of only 5 µm. The visible phases are the same as for the previous figure, however no residual cavity is present in this entirely filled pore. Thus it seems that the inlet diameter of the pore has an influence on the presence of residual cavities.

b) Sample F: $HfSi_2$ on a 3D C/C Composite at 1,800° C. for 15 Minutes.

As the reactive infiltration in a liquid phase of $HfSi_2$ within a 2D C/C pre-form is efficient, RMIs were carried out on 3D C/C composites.

FIG. 38 shows an overall view of the impregnation. The liquid wetted many surfaces. The infiltration took place not only vertically but also horizontally, by capillarity. The horizontal distribution of the liquid seems to be homogenous among all the infiltration channels, unlike sample E. No residual metal remains at the surface of the pre-form, further, no residual metal phase was observed in the porosities of this sample.

FIG. 39 shows that the liquid phase not only wetted the inter-filament porosities but also many inter-fiber porosities. The macro-porosities are in majority filled with HfC carbides. Certain carbons surfaces are covered with a SiC/HfC/SiC multilayer.

FIG. 40 confirms that the infiltration took place not only between the strands forming the C/C composite but also between the fibers forming these strands. Indeed, the spaces covered with carbides are mainly inter-filament porosities, however channels between the fibers and between the graphite sheets are sometimes infiltrated and filled with carbides. This figure also shows a behaviour observed in the whole sample: the small pores and infiltration microchannels are in majority filled with SiC, while the HfC carbides are in majority located on the pores of large diameter, including the inter-wires porosities.

FIG. 41 shows the presence of an SiC layer between the carbon and HfC, this regular layer with a thickness comprised between 50 nm and 1 µm is present on all the sample. This figure, as well as FIG. 39 shows the fact that the carbides adhere with the fibers: there is no void between the carbide grains and the carbon.

c) Sample G: $HfSi_2$ Via a Slurry on 3D C/C Composite at 1,800° C. for 15 Minutes.

A solution for homogenizing and increasing the amount of infiltrated metal in the pre-form is the use of a slurry: the pre-form is infiltrated in vacuo and under cold conditions with a slurry consisting of $HfSi_2$ powder and ethanol (30% by volume of ethanol). Once the ethanol has evaporated, the powder is contained in the pre-form and the heat treatment takes place: 15 minutes at 1,800° C. by using the HT wetting bench.

FIG. 42 shows that the infiltration having used a slurry gives the possibility of wetting both the inter-filament porosities and the inter-fiber porosities. The hafnium seems to have infiltrated in a more consequent way the micropores than for the previous samples, thus the use of a slurry reduces the dependency of the SiC/HfC ratio on the diameter of the pores. Infiltration actually takes place over the whole pre-form.

FIG. 43 shows the presence of SiC between the carbon and HfC. This layer is visible on the whole sample. The diameter of the pores all the same seems always to have an influence on the type of carbides filling the latter.

The use of a slurry in a laboratory is therefore of interest and gives the possibility of homogenizing the infiltration outside the substrate: the alloy already being in the pre-form, the initial reaction surfaces are much larger.

d) Sample H: $HfSi_2$ on 3D C/C at 1,800° C. for 15 Minutes and then Si at 1,600° C. for 5 Minutes.

The use of $HfSi_2$ for reactive infiltration in a liquid phase of C/C materials allows formation of many carbides of HfC and SiC without formation of any residual metal phase. However, certain macropores are still accessible and may be infiltrated again. In order to cover these macropores with silicon carbide for ensuring and amplifying the amount of ceramic, a second reactive infiltration may be carried out with silicon.

FIG. 44 illustrates the infiltration made inside the sample H. The liquid has properly wetted the inter-fiber porosities, and many SiC carbides are visible with a few HfC inclusions. The grains of the SiC carbides have a thickness comprised between 1 and 10 µm, while the size of the HfC grains is comprised between 0.5 and 3 µm.

FIG. 45 exhibits inter-filaments and inter-fibers infiltration. The SiC/HfC ratio depends on the size of the porosities. Indeed, the inter-wires infiltration macro-channels have a much smaller SiC/HfC ratio than the inter-fibers infiltration micro-channels.

FIG. 46 shows that the second silicon pass completes the macroporosities with new silicon carbides. The HfC carbides seem to be less concentrated on the upper portion of the pre-form, and their spreading seems to be more regular.

In the whole sample, no metal phase is observed and the cohesion of the carbides with the carbon seems to be still stronger than previously (by the spreading of the HfC carbides).

e) Sample I: $HfSi_2$ on 3D C/C at 1,800° C. for 15 Minutes, Pyrolysis with Pitch, Si at 1,600° C. for 5 Minutes.

In order to produce a new multilayer, a pitch pyrolysis step in the autoclave shown above was carried out between two RMI passes.

FIG. 47 shows the infiltration inside the sample I. All the periphery of the filaments of fibers, as well as of the macroporosities between the filaments is covered with a regular layer of carbides. Certain inter-fiber porosities have been infiltrated. The distribution of the HfC carbides is regular, both horizontally and vertically.

FIG. 48 shows the multilayer structure which is deposited on the inter-wires and inter-fibers spaces. Indeed, an SiC layer is present at the interface between the carbon and HfC in the whole sample. This layer has a thickness comprised between 50 nm and 1 µm. The SiC/HfC ratio depends on the diameter of the pores: the inter-fibers micropores are in majority filled with SiC, while the macroporosities are in majority filled with HfC.

FIGS. 49 and 50 show that the PyC layer is properly deposited, during the pitch pyrolysis, into the macropores of the C/C composite. Silicon actually reacted with C and formed SiC carbides all around this deposit of pyrocarbon (PyC). The grains of these new carbides have a size comprised between 2 and 8 µm. HfC carbides inclusions are visible on the deposit of PyC. As the second pass was only carried out with silicon, these HfC carbides had to be moved during the second RMI by the silicon flow, and disseminated in the sample. No metal phase is observed in this sample, the observed carbides are all coherent with the carbon.

Conclusions.

Upon considering the foregoing examples, in the following we shall engage in a detailed discussion on the influence of the time parameters and temperatures in the method according to the invention, on the importance of the morphology of the substrate (pre-form) in the method according to the invention. A kinetic/thermodynamic approach is also exposed which explains the multilayer formation of the deposit.

This discussion and this account are however by no means limited to the particular examples but contain teachings which generally apply to the method according to the invention and not only to particular and specific embodiments thereof.

By studying the reactive infiltration in a liquid phase of carbonaceous materials using the binary Hf—Si system, achieved in the examples shown above, it was possible to determine that $HfSi_2$ was the most suitable intermetallic compound for carrying out RMI from a mixture of metal, compacted powders, at temperatures less than or equal to 1,800° C.

The use of hafnium disilicide actually allows not only an equidistribution of the hafnium over the width of the infiltration, but also having a compound with a single melting temperature, which avoids premature infiltration of the silicon into the pre-form.

The study of the samples A to I showed different elements.

All the carbides formed in the samples are cohesive with graphite or carbon fibers.

Indeed, no space between the carbon and the formed carbides was observed, even after ionic polishing operations carried out inter alia for the sample A.

The thin SiC layer present on the whole interface between the carbon and the hafnium carbides should be responsible for this cohesion between the carbon and the carbides multilayer coating.

Samples H and I have shown that a second RMI carried out with silicon allowed a more regular distribution of the HfC carbides in the sample.

This means that the liquid silicon flow infiltrating the pre-form carries away certain HfC carbides filling the macropores from the top of the sample to the bottom of the sample. These «mobile» HfC carbides are generally dispersed in the macropores above a fixed HfC layer which is in contact with SiC. This phenomenon tends to confirm that it is actually the silicon carbide which provides cohesion between the HfC carbides and the carbon.

The RMI of $HfSi_2$ at 1,800° C. for 5 minutes seems to be perfectly suitable for 2D C/C composites if the volume of infiltration metal positioned at the surface is equal to about 20% of the porosity volume in the pre-form.

Also, the reactive infiltration in a liquid phase of $HfSi_2$ at 1,800° C. for 15 minutes of 3D C/C pre-forms is efficient and leads to deposition of an SiC/HfC bilayer in a single step.

The formation of residual metal phases is avoided by limiting the amount of infiltrated metal.

This deposition takes place both in the inter-wire porosities and in the inter-fibers porosities. However, it is noticed that the inter-fiber spaces are in majority filled with SiC carbides while the macroporosities have a large concentration of HfC.

The foregoing examples show that the main parameters governing porosity after reaction of the pre-form, and the residual phases are the temperature, the reaction time and the morphology of the pre-form as defined by the size of the pores and the initial porosity of this pre-form.

Influence of the Temperature and Time Parameters.

The reactive infiltrations in a liquid phase as described in the examples above were carried out with defined time parameters and temperature arbitrarily. The influence of the variation of the temperature and time parameters on the formed phases within the pre-forms is now shown.

The purpose is to minimize the reaction time and the amount of residual metal phases in the pre-form while observing the material limits.

In this study, the high-temperature wetting bench is equipped with a high frequency and high power inductive furnace/oven, it is therefore wiser not to use it for more than 15 minutes at maximum temperature.

The results of the samples B to D give the possibility of discussing the influence of the temperature parameters and time on the residual metal phases in the pores of the graphite 6103 discs.

The figures corresponding to these samples have pores of similar sizes with a maximum width of about 60 μm.

The sample B from an infiltration at 1,600° C. for 15 minutes contains a larger proportion of metal phase HfSi in the pre-form than the sample C from a 2 minute RMI at 1,800° C. The temperature has therefore a direct effect on the residual phases.

The sample D showed that a longer treatment time promoted total carbidization of the phases present in these pores.

The phases formed during RMI with $HfSi_2$ therefore directly depend on the temperature and time parameters used. The larger the temperature, the tinier will be the amount of residual metal and the larger the amount of carbide. In the same way, the longer the plateau time at a same temperature, the larger will be the amount of carbide, produced in the micropores to the expense of metal phases.

The temperature not only directly acts on the free enthalpy values of the carbides and of the silicides and therefore on the various free reaction enthalpies, but it also acts on the diffusion coefficients of the elements. Indeed, at 1,800° C., the diffusion coefficient of carbon in SiC and in HfC is greater than at 1,600° C. As the carbon diffuses more into the carbides, a larger amount of metal phase may react for carbide formation (carburizing).

The optimum temperature and plateau duration parameters for reactive infiltration of $HfSi_2$ in a liquid phase under the preferred conditions, i.e. under argon flow, with a metal volume equal to 20 to 30% of the vacuum volume in the sample, within the 6103 discs are 1,800° C. for 15 minutes.

The various infiltrations carried out showed the absence of any residual metal phase in 2D C/C pre-forms for a treatment time of 5 minutes at 1,800° C. However, the carbon/carbon materials used have a dispersion in the size of the pores similar to that of 6103 discs. This behavior means that the morphology of the pre-form has a direct influence on the phases formed.

Influence of the Morphology of the Pre-Form.

Sample A shows that a regular size of pores and comprised between 1 and 30 μm may limit the amount of liquid having infiltrated the pre-form. Indeed, the pores close to the infiltration surface are all filled with carbides, while the pores located more deeply were not wetted by the liquid. Thus, what limited the metal infiltration in the graphite pre-form is not an initial lack of metal above the sample but the size of the pores. Indeed, when the reactive infiltration takes place, there is a competition between the wetting of the liquid in the carbonaceous pre-form and the formation of carbide. When the carbides are formed at the surface, they fill the infiltration routes if they are of a small diameter which therefore limits the amount of material introduced into the pre-form. Thus the infiltrations achieved with 2175 discs are limited by the small size of the pores and the initial low porosity of the latter. Nevertheless, the small diameter of the pores allows the total reaction of the infiltrated alloy with carbon, whence the absence of residual metal phases on these discs.

The various experiments conducted on the discs 6103 gave the possibility of determining that the critical diameter of the pores for avoiding formation of a residual metal phase with a treatment of 15 minutes at 1,800° C. was 50 μm. Beyond this value, two cases are possible: either the pore is not blocked and only a multilayer of carbides is deposited on the carbon, or the pore is blocked and the probability of presence of two residual metal phases, one rich in silicon and the other close to HfSi, is great. This comment is only valid for 6103 discs.

The results of the samples E and F show that infiltration with $HfSi_2$ of C/C pre-forms is very efficient. The infiltration of these materials is limited by the initial amount of $HfSi_2$: the sample having macroporosities, the liquid infiltrates and wets the pre-form not only by following vertical porosity paths but also horizontal porosity paths. Accordingly, no residual metal at the surface or any residual metal phase subsists in the macropores. The more the infiltration surface is homogenous, the less it has HfC carbides at the surface or concentrated in the upper portion of the pre-form. Thus, in 3D C/C composites: the alloy is "absorbed" by capillarity in all the channels because of the 3 orthogonal infiltration directions, while the 2D pre-form "forces" the liquid phase to follow only 2 directions, which concentrates a portion of the liquid in certain macro-channels and forms aggregates of HfC grains.

All the infiltrations achieved show that the SiC/HfC ratio depends on the diameter of the pores. This dependency may be explained by considering the fluidity of the liquid phases infiltrating the pre-forms. A hafnium-rich phase has a much higher melting temperature than a phase which is poor in hafnium, its viscosity at 1,800° C. then being greater. Now, in order to infiltrate small channels, the advantageous phase is the one having the lowest viscosity, therefore more silicon. Thus, the viscosity gradient of the metal phases during infiltration generates a greater presence of SiC than of HfC in the micropores and microchannels; and vice versa, a larger concentration of HfC at the large porosities. This behavior means, for C/C materials, that most inter-fiber spaces are filled with a SiC/HfC ratio of more than 5, while the inter-filament spaces have an SiC/HfC ratio of less than 0.2.

The presence of a residual cavity in the carbidized pores, was demonstrated by several authors within the scope of silicidation. These cavities inside small pores are ascribed to the presence of gas species in the material during infiltration with the liquid phase.

The presence of residual cavities in certain infiltrated pores may be explained by two phenomena as explained in the document of [QUET 2007].

First phenomenon: the gases are trapped by a too rapid impregnation rate of the pores. The liquid migrates more rapidly through the walls of the pore than through the centre. The present gases are confined by premature blocking of the end opposite to that of the inlet of the liquid metal and/or by blocking of the inlet.

Second phenomenon: the inlet diameter of the pores also plays a role in the densification with a liquid metal. A reduction in the size of the pores induces a smaller liquid metal volume flow rate. The blocking of the ends is therefore slower. Thus, a smaller inlet diameter gives the possibility of slowing down the penetration rate of the liquid phase into the porosity and improves the densification of the pores. This may justify the differences observed in partial or total filling of the pores.

The study of the RMIs achieved on graphite discs showed that if the pores have a reduced diameter, for example between 1 and 20 μm, the carbidization of the pores at the surface may limit the infiltration by blocking the pores. Simultaneously, both for the graphite discs and for the C/C composites, the pores having a too large average diameter, for example of more than 50 μm, have two different behaviors: if they are close to the infiltration surface, these pores have a thick layer of SiC and HfC carbides, but may also contain at the centre residual metal phases, rich in silicon or close to HfSi. If they are in the core of the pre-form, the macropores are simply covered with an SiC/HfC carbide bilayer with for example a thickness from 50 to 500 nm for SiC and up to 15 μm for example for the HfC carbide.

The difference in fluidity of the metal phases generates a dependency of the SiC/HfC ratio in the channels or pores depending on the diameter of the latter. As the silicon-rich phases are more fluid than those comprising a large portion of hafnium, silicon carbide is quasi a majority in all the infiltration pores or channels, for which the diameter is for example less than 5 μm.

Certain pores, infiltrated and of small diameter, have residual cavities. These cavities are due to an infiltration rate of the liquid into the pore being too rapid. The inlet diameter of the pore plays a primordial role in regulating the liquid metal volume flow rate. If the inlet diameter is large, the probability of having a residual cavity increases.

The presence of a residual cavity in the micropores is not desirable, since it is the source of a stress concentration point. In order to remove the residual cavities, the impregnation rate of the pre-form with the liquid must be slowed down, in order to allow the gas species to escape from the pores before blocking the inlets of the latter.

Formation of the Observed Microstructures

Presence or Absence of Residual Metal Phases

The previous parts gave the possibility of showing the influence of the different parameters on the final phases after reactive infiltration. The absence of residual metal phases in the pores of the samples after suitable heat treatments may be explained by means of the ternary diagram shown in FIG. 51.

The pre-form is entirely in carbon, the initial amount of alloy is limited to 12 mm$^3$, the mixture is therefore in majority carbon. It is located at about the cross illustrated in the ternary diagram above. The latter is in the C—HfC—SiC triangle, which means that the final phases once the reactive infiltration is finished at 1,800° C., should be HfC, SiC and C. These are actually the observed phases. During carbidization, the amount of carbon decreases, and the mixture changes over time in the direction of the arrow present in the diagram. However, carbon diffuses through the carbides and always attains the liquid for continuing the formation of carbide. The absence of any residual metal phase in most examples is explained by the structure of the mixture which is in a large majority carbon. This is due to the volume of metal positioned on the pre-form equivalent to 25% of the empty volume in the latter, and to the small size of the pores which generates a larger reaction surface for a same open porosity.

When the size of the pores is large: for example above 50 μm for a treatment of 1,800° C. for 15 minutes, the centre of the pore is lacking in carbon (the carbon has to diffuse as far as the centre of the pore), thus certain metal phases may remain in the pore, if they do not wet other carbon surfaces. These metal phases have at 1,800° C. the compositions shown at equilibrium with the carbides on the ternary diagram.

Formation of the Multilayer Microstructure

The table below shows the free enthalpies at 1,827° C. of the various phases of the system. From a thermodynamic point of view, the HfC carbide is the most stable phase with carbon. The free enthalpy of HfC being twice «more negative» than that of SiC, it should be formed at the interface against the carbon.

Free Enthalpies of the Phases at 1,827° C. Calculated by ThermoCalc

| | Liq (HfSi$_2$) | HfSi$_{(s)}$ | C$_{(s)}$ | Hf$_{(s)}$ | Si$_{(l)}$ | HfC$_{(s)}$ | SiC$_{(s)}$ |
|---|---|---|---|---|---|---|---|
| G (kJ) | −164.6 | −195.2 | −50.1 | −158.7 | −107.3 | −399.1 | −200.1 |

NB: The values as well as the ternary diagram, were calculated by ThermoCalc from a thermodynamic database made from the documents [BITT 1997; BAND 2004; ZHAO 2000]; Liq(HfSi$_2$) corresponds to the liquid having a composition equivalent to HfSi$_2$.

Now the ionic polishing operation carried out on the sample A showed the presence of an SiC layer between the carbon and the HfC carbides on all the surfaces of the sample. This SiC layer at the carbon/HfC interface is visible in and on all the samples: M1 to M5, and A to I. The mechanism for forming the carbides in the C/C composites is therefore the same as the one in the graphite discs and also leads to a SiC/HfC multilayer microstructure in contact with the carbon. FIG. 52 shows a simplified diagram of the observed microstructure with metal or vacuum (521), HfC (522), SiC (523), SiC and/or a pore (524) and carbon (525).

This presence of SiC between the carbon and the HfC carbides is not consistent with the values of the free enthalpies of the phases shown earlier.

When the temperature attains 1543° C., HfSi$_2$ melts at instant t. It then decomposes into HfSi and a liquid which, at instant t+ε, will have an atomic composition from 20 to 30% of hafnium. Thus the «first liquid» contacting and wetting the carbon comprises from 20 to 30% of hafnium. Accordingly, the formation of this SiC layer cannot be ascribed to premature infiltration of a liquid only comprising silicon.

In order to explain the mechanism for forming this multilayer in contact with carbon, the free enthalpies of the possible reactions in the system were calculated via the values of the above table.

For reaction [1]

Liq(HfSi$_2$)±3C→HfC+2SiC, one has:

$$\Delta G_{reaction[1]}\Delta G_f(\text{HfC})+2{*}\Delta G_f(\text{SiC})-3{*}\Delta G_f(\text{C})-\Delta G_f(\text{Liq}(\text{HfSi}_2))$$

Whence at 1,827° C., the free enthalpy of the reaction [1] is:

$$\Delta G_{reaction[1]}=-485.3 \text{ kJ·mol}^{-1}$$

Thus one has the table hereafter.

Free Enthalpies of Different Reactions at 1,827° C.
Between Liq(HfSi$_2$), HfSi, HfC, SiC, Si, Hf and C

| No. | Relevent reaction equation | $\Delta G_{reaction@2100K}$ (kJ · mol$^{-3}$) |
|---|---|---|
| [1] | Liq(HfSi$_2$) + 3C$_{(s)}$ → HfC$_{(s)}$ + 2SiC$_{(s)}$ | −485.3 |
| [2] | Liq(HfSi$_2$) + C$_{(s)}$ → HfC$_{(s)}$ + 2 Si$_{(l)}$ | −400.0 |
| [3] | Liq(HfSi$_2$) + 2C$_{(s)}$ → Hf$_{(s)}$ + 2SiC$_{(s)}$ | −294.5 |
| [4] | Liq(HfSi$_2$) + C$_{(s)}$ → HfSi$_{(s)}$ + SiC$_{(s)}$ | −181.6 |
| [5] | HfSi$_{(s)}$ + 2C$_{(s)}$ → HfC$_{(s)}$ + SiC$_{(s)}$ | −303.7 |
| [6] | HfSi$_{(s)}$ + C$_{(s)}$ → HfC$_{(s)}$ + Si$_{(l)}$ | −261.1 |
| [7] | 2 HfSi$_{(s)}$ + C$_{(s)}$ → Liq(HfSi$_2$) + HfC$_{(s)}$ | −122.2 |
| [8] | HfSi$_{(s)}$ + C$_{(s)}$ → Hf$_{(s)}$ + SiC$_{(s)}$ | −112.5 |
| [9] | Hf$_{(s)}$ + C$_{(s)}$ → HfC$_{(s)}$ | −191.2 |
| [10] | Hf$_{(s)}$ + SiC$_{(s)}$ → HfC$_{(s)}$ + Si$_{(l)}$ | −148.6 |
| [11] | Si$_{(l)}$ + C$_{(s)}$ → SiC$_{(s)}$ | −42.6 |
| [12] | Si$_{(l)}$ + HfC$_{(s)}$ → SiC$_{(s)}$ + Hf$_{(s)}$ | +148.6 |

NB:
All the enthalpies were calculated from data of the table of the present paragraph. Liq(HfSi$_2$) corresponds to liquid having a composition equivalent to HfSi$_2$.

As the carbide HfC is a very stable carbide, it has a highly negative enthalpy which implies that all the chemical reactions, of which it is the product, have more negative $\Delta G_{reaction}$ than the others. The more negative is the $\Delta G_{reaction}$ of a chemical reaction, the more the system tends to carry out this chemical reaction.

Thus, according to the thermodynamic study, HfC should be formed at the interface with C, because of its reactivity. The values of the table above actually specify that the reactions are the most likely to occur, in our system, are [1], [2], [3] and [5]. It is interesting to note that reaction [12] is impossible: the silicon cannot consume the hafnium carbide in order to form its own carbide, unlike reaction [10] wherein hafnium may consume the silicon carbide in order to form HfC.

The uncertainty on the liquidus temperatures of the Hf—Si binary system (see examples) does not give the possibility of defining whether at 1,800° C., the solution consists of two phases: a liquid phase and HfSi, or only of a liquid solution of silicon and hafnium. Now the multilayer microstructure is observed both when the infiltration temperature is 1,600° C., 1,700° C. and 1,800° C. Thus, depending on the observed results, a homogeneous solution of HfSi and of a liquid comprising 20 to 30% of hafnium is considered between 1,543° C. and 1,800° C. HfSi therefore infiltrates the preform by following the flow of the liquid.

Thermodynamics defines the state towards which the system tends, but it does not take into account either the reaction kinetics, or the activation energies of each reaction. Now the activation barrier to be crossed in order to form a phase is proportional to the stability of the latter: the more the final state is stable, the higher is the barrier to be crossed for triggering the reaction. Accordingly, the activation barrier for forming HfC is much more substantial than that of SiC.

FIG. 53 shows the time-dependent change in the activation barriers according to the enthalpy of a reaction: the enthalpy of reaction A$_2$+B$_2$→C$_2$+D$_2$ is more negative than the other. Therefore one has E$_{A2}$>E$_{A1}$.

Accordingly, this multilayer structure there may be explained by a mechanism in several steps:

i. During the rise in temperature and before its melting at 1,543° C., HfSi$_2$ may normally react with carbon according to reactions [1] to [4]. Indeed, one has: $\Delta G_{reaction[2]@180° K}$=−335 kJ·mol$^{-1}$. But the activation barrier of these reactions is too great and the energy of the system is insufficient, the reaction therefore does not take place. Further the temperature rise rate of the oven does not leave time for HfSi$_2$ to react as long as it is solid.

ii. Beyond 1,543° C., HfSi$_2$ is incongruently broken down into two phases which infiltrate the carbon preform: HfSi and a liquid phase comprising about 80% of silicon and 20% of hafnium. HfSi is carried away in the infiltration flow of the liquid phase.

iii. HfSi does not react in order to form HfC according to the reactions for the same reasons as HfSi$_2$ at point i. The energy of the system is insufficient for crossing the activation barrier of these reactions.

iv. HfSi and/or the silicon contained in the liquid phase react according to reactions [8] and/or [11], since the activation energy of these chemical reactions is much smaller than those of the previous reactions. Silicon carbide SiC is then formed upon contact with carbon.

v. As the reactions [8] and [11] are exothermic (the reaction enthalpy is less than 0), a local increase in temperature occurs as SiC is gradually formed. This rise in temperature may promote carbon diffusion towards the liquid through SiC, and also increase sufficiently the energy of the system so as to exceed the activation barrier of the reactions forming HfC.

vi. The activation barrier having been crossed, the reactions [5], [6] and [10] may take place. HfC is then formed above the SiC layer which is in contact with the carbon. The supply of carbon is ensured by diffusion of the latter through the SiC carbides.

The formation above the SiC of a layer exclusively HfC, and not mixed, is quite unexplained. Various reasons are possible: the reaction [5] perhaps has not sufficient energy for crossing the activation barrier. If the reaction [5] takes place, it is possible that the hafnium present in the liquid phase consumes the SiC formed according to reaction [10]. A study of the activity of the carbon in the system should be conducted in order to explain this layer.

Thus, the multilayer structure is formed by the competition between the free reaction enthalpies and the activation barriers. The low activation barrier for formation of SiC gives the possibility of making a thin SiC layer in contact with the carbon, but as the reaction is exothermic, it promotes diffusion of the carbon, increases the energy the system and allows reactions to occur for carburizing hafnium.

REFERENCES

[BAND 2004] D. Bandyopadhyay, *The Ti—Si—C System (Titanium-Silicon-Carbon)*, J. of Phase Equilibria and Diffusion, Vol. 25, No. 5, 2004.

[BITT 1997] H. Bitterman, P. Rogl, *Critical Assessment and Thermodynamic Calculation of the Binary System Hafnium-Carbon (Hf—C)*, J of Phase Equilibria, Vol. 18, no 4, 1997.

[DEKE 2010] A. Dekeyrel, *Mise au point d'un procédé d'élaboration rapide de composites Carbone/Carbone haute densité*, Thesis, 2010.

[EINS 1998] E. O. Einset, *Analysis of Reactive Melt infiltration: I. Derivation of the Governing Equation*, Chemical Engineering Science, 1998.

[EVAN 1974] C. C. Evans, A. C. Parmee, R. W. Rainbow, *Silicon treatment of Carbon Fiber-Carbon Composites*, Proceedings of 4$^{th}$ London Conference on Carbon and Graphite, 1974, p. 231-235.

[FAVR 2003] A. Favre, H. Fuzelier, J. Suptil, *An original way to investigate the siliconizing of carbon materials*, Ceram Int (29), 2003, p. 235-243.

[FITZ 1998] E. Fitzer, L. M. Manocha, *Carbon reinforcements and carbon/carbon Composites*, 1998, p. 281-309.

[GOKH 1989] A. B. Gokhale, G. J. Abbaschian, *The Hf—Si (Hafnium-Silicon) system*, Bull of Alloy Phase Diagrams, Vol. 10, No 4, 1989.

[HILL 1975] W. B. Hillig, R. L. Mehan, C. R. Morelock, V. I. DeCarlo and W. Laskow, *Silicon/Silicon Carbide Composites*, Am Ceram Bull (54), No. 12, 1975.

[KREN 2005] W. Krenkel, *Carbon Fiber Reinforced Silicon Carbide Composites (C/SiC, C/C—SiC)*, Handbook of ceramic composites, 2005, p. 117-148.

[NELS 1999] E. S. Nelson, P. Collella, *Parametric Study of Reactive Melt Infiltration*, Application of Porous Media Methods for Engineered Materials, 1999, 18770.

[QUET 2007] A. Quet, *Composites de friction à matrice céramique*, Thesis, 2007.

[RUDY 1969] E. Rudy, *C—Hf—Si Phase Diagram*, Ternary Phase Equilibria Journal, 1969, no. 150168.

[VOIG 2011] R. Voigt, W. Krenkel, G. Motz, *Development of ultra-high temperature stable ceramics by reactive infiltration processes*, Processing and Properties of Advanced Ceramics and Composites III, p. 123-129.

[WANG 2012] Y. Wang, X. Zhu, L. Zhang, L. Cheng, *C/C—SiC—ZrC composites fabricated by reactive melt infiltration with $Si_{0.87}Zr_{0.13}$ alloy*, Ceramics International, 2012.

[WILL 2007] B. Williams, R. Benander, *Method of making carbon fiber-carbon matrix reinforced ceramic composites*, U.S. Pat. No. 7,297,368, 2007.

[YE 2012] Y. Ye, H. Zhang, P. Zhang, *Investigation of anti-ablation property of Cf/HfC composite prepared at 1900° C. by reactive melt infiltration*, $15^{th}$ European Conference on Composite Materials, 2012.

[ZHAN 2011] S. Zhang, S. Wang, W. Li, Y. Zhu, Z. Chen, *Preparation of $ZrB_2$ based composites by reactive melt infiltration at relative low temperature*, Materials Letters, no. 65, 2011, p. 2910-2912.

[ZHAO 2000] J-C. Zhao, B. P. Bewlay, M. R. Jackson Q. Chen, *Hf—Si Binary Phase Diagram Determination and Thermodynamic Modeling*, J. Phase Equilibria, Vol. 2, No. 1, 2000.

[ZOU 2010] L. Zou, N. Wali, J-M. Yang, N. P. Bansal, *Microstructural development of a $C_f$/ZrC composite manufactured by reactive melt infiltration*, J. Eur Ceram Soc 30, 2010, p. 1527-1535.

The invention claimed is:

1. A method for preparing a metals carbides multilayer coating on at least one surface of a first carbon layer of a substrate, or on the surface and under the surface inside the first carbon layer, by a reactive melt infiltration technique, the method comprising:

the following successive a) to d) being carried out:

a) putting the at least one surface into contact with a solid metal disilicide $MSi_2$, wherein M is selected from hafnium, titanium, and tantalum;

b) heating the substrate and the metal disilicide up to a temperature $T_P$ above the melting temperature of the metal disilicide;

c) observing a plateau at the temperature $T_P$ for a sufficient duration so that the metal disilicide reacts with carbon of the first carbon layer and forms a first multilayer coating comprising a dense and continuous layer of SiC, fully covered by a dense and continuous layer of MC;

d) cooling the part provided with the first multilayer coating;

and then, at the end of d), the following e) is further carried out, and then the following successive f) to i) are carried out, or the following successive f) to i) are carried out without e);

e) depositing a second carbon layer at the surface of the first multilayer coating;

f) putting the surface of the first multilayer coating still containing the carbon of the first carbon layer or the surface of the second carbon layer into contact with a solid metal disilicide $MSi_2$, wherein M is selected among hafnium, titanium, and tantalum;

g) heating the surface of the first multilayer coating still containing said carbon of the first carbon layer and the metal disilicide, or the second carbon layer and the metal disilicide, to a temperature $T_P$ above the melting temperature of the metal disilicide;

h) observing a plateau at a temperature $T_P$ for a sufficient duration so that the metal disilicide reacts with the carbon of the first carbon layer or with carbon of the second carbon layer and forms a second multilayer coating comprising a dense and continuous layer of SiC, fully covered by a dense and continuous layer of MC;

i) cooling the part provided with the second multilayer coating;

and then at the end of i), optionally the following j) is further carried out;

j) depositing a third carbon layer at the surface of the second multilayer coating;

and at the end of i) or of j), the following k) is further carried out;

k) carrying out silicidation of the surface of the second multilayer coating still containing carbon or of the third carbon layer with liquid Si, whereby a SiC layer is obtained on the second multilayer coating.

2. The method according to claim 1, wherein the first carbon layer is a carbon layer deposited on said substrate, said substrate being made of a material different from carbon.

3. The method according to claim 2, wherein the material different from carbon is selected from carbide ceramics or SiC; composite materials of carbide ceramics or SiC/SiC composites; nitride ceramics; boride ceramics; oxide ceramics; metals; and mixtures thereof.

4. The method according to claim 1, wherein the first carbon layer is a layer of a substrate fully made of carbon.

5. The method according to claim 4, wherein the carbon which constitutes the substrate is entirely made of graphite.

6. The method according to claim 4, wherein the carbon which constitutes the substrate fully made of carbon is in a form of carbon fibers, carbon wires, or in a form of a carbon/carbon composite material or a 2D or 3D composite material.

7. The method according to claim 4, wherein the carbon substrate has an average open porosity from 1% to 99% by volume, determined by measuring buoyancy force.

8. The method according to claim 7, wherein the surface is put into contact with a volume of solid metal disilicide $MSi_2$, of less than 30% of the volume of the average open porosity of the carbon substrate, or between 20% and 30% of the volume of the average open porosity of the carbon substrate.

9. The method according to claim 1, wherein the contacting of the surface with the solid metal disilicide $MSi_2$ is achieved by depositing the metal disilicide $MSi_2$ on the surface, or by depositing a carbon substrate and $MSi_2$ in a crucible.

10. The method according to claim 9, wherein the metal disilicide $MSi_2$ is deposited on the surface in a form of a powder, either compacted or not, or in a form of a slurry of a powder of the metal disilicide $MSi_2$ and of a liquid.

11. The method according to claim 1, wherein the temperature $T_P$ is from 900° C. to 2,500° C.

12. The method according to claim 1, wherein, during b) a rapid rise in temperature is carried out up to the temperature $T_P$.

13. The method according to claim 1, wherein the plateau at temperature $T_P$ is observed for a duration from 5 minutes to 15 minutes.

14. The method according to claim 1, wherein e) is repeated, and then f) to i) are repeated; and then j) and k) are carried out.

15. The method according to claim 1, wherein the temperature $T_P$ is 1,800° C.

16. The method according to claim 1, wherein, during b) a rapid rise in temperature at a rate of 1,000° C. to 3,000° C./minute up to the temperature $T_P$ is carried out.

17. The method according to claim 1, wherein, during b) a rapid rise in temperature at a rate of 2,800° C./minute up to the temperature $T_P$ is carried out.

* * * * *